United States Patent
Kato et al.

(10) Patent No.: US 7,163,615 B2
(45) Date of Patent: Jan. 16, 2007

(54) METHOD OF TREATING SUBSTANCE TO BE DEGRADED AND ITS APPARATUS

(75) Inventors: Kinya Kato, Kanagawa (JP); Masahiro Kawaguchi, Kanagawa (JP); Akira Kuriyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 607 days.

(21) Appl. No.: 10/291,370

(22) Filed: Nov. 12, 2002

(65) Prior Publication Data

US 2003/0089594 A1 May 15, 2003

(30) Foreign Application Priority Data

Nov. 12, 2001 (JP) ............................. 2001-346168
Jun. 25, 2002 (JP) ............................. 2002-184777

(51) Int. Cl.
*C02F 1/461* (2006.01)

(52) U.S. Cl. .................. 205/688; 205/742; 204/157.3; 422/186.3; 423/245.1; 588/303; 588/306; 588/309; 210/748

(58) Field of Classification Search ................ 210/748; 588/303, 306, 309; 204/157.3; 422/186.3; 423/245.1; 205/742, 688
See application file for complete search history.

(56) References Cited

U.S. PATENT DOCUMENTS

| | | | |
|---|---|---|---|
| 3,649,493 A | 3/1972 | Meiners et al. .......... 204/157.1 |
| 4,009,099 A | 2/1977 | Jeris .............. 210/3 |
| 4,236,992 A | 12/1980 | Themy ..................... 204/278 |
| 4,361,471 A | 11/1982 | Kosarek ..................... 210/128 |
| 4,555,323 A | 11/1985 | Collier ........................ 204/258 |
| 4,707,226 A * | 11/1987 | Dapperheld ................. 205/440 |
| 4,761,208 A | 8/1988 | Gram et al. .................. 204/95 |
| 4,927,621 A | 5/1990 | Repman et al. ............. 423/488 |
| 5,039,383 A | 8/1991 | Spotnitz et al. ............. 204/128 |
| 5,238,628 A * | 8/1993 | Mori et al. ................. 264/611 |
| 5,260,036 A | 11/1993 | Weigold et al. .......... 422/186.3 |
| 5,340,555 A | 8/1994 | Mashio et al. .......... 423/240 R |
| 5,370,740 A | 12/1994 | Chao et al. ..................... 134/1 |
| 5,393,394 A | 2/1995 | Ikeda et al. .............. 204/158.2 |
| 5,460,792 A | 10/1995 | Rosenbaum ............. 423/245.3 |
| 5,494,574 A | 2/1996 | Unterman et al. .......... 210/150 |

(Continued)

FOREIGN PATENT DOCUMENTS

DE 43 30 518 A1 3/1995

(Continued)

OTHER PUBLICATIONS

Water Processing Technology, vol. 37, No. 5, pp. 241-250 (1996) (with translation), no month given.

(Continued)

Primary Examiner—Arun S. Phasge
(74) Attorney, Agent, or Firm—Fitzpatrick, Cella, Harper, & Scinto

(57) ABSTRACT

There is provided a method of treating a substance to be degraded comprising the steps of: degrading the substance to produce a degraded product; contacting the product obtained in the degrading step with a liquid; and entrapping a component of the product not trapped by the liquid in a medium by contacting the component with the medium. Also, the apparatus for conducting the method is provided.

13 Claims, 10 Drawing Sheets

U.S. PATENT DOCUMENTS

| | | | |
|---|---|---|---|
| 5,525,008 A | 6/1996 | Wilson | 405/128 |
| 5,578,193 A | 11/1996 | Aoki et al. | 205/746 |
| 5,582,741 A | 12/1996 | Kenmoku et al. | 210/748 |
| 5,611,642 A | 3/1997 | Wilson | 405/128 |
| 5,616,234 A | 4/1997 | Rhees et al. | 205/500 |
| 5,714,665 A | 2/1998 | Ohtake et al. | 588/204 |
| 5,832,361 A | 11/1998 | Foret | 422/186 |
| 5,980,727 A | 11/1999 | Putz et al. | 205/688 |
| 6,238,628 B1 | 5/2001 | Matsutani | 422/172 |
| 6,444,015 B1 | 9/2002 | Kato | 95/143 |
| 6,462,250 B1 | 10/2002 | Kuriyama et al. | 588/204 |
| 6,497,795 B1 * | 12/2002 | Kato | 204/157.3 |
| 6,585,897 B1 | 7/2003 | Kato | 210/756 |
| 6,800,257 B1 * | 10/2004 | Kuriyama et al. | 422/186.3 |
| 2002/0008069 A1 | 1/2002 | Kato et al. | 210/748 |
| 2002/0017496 A1 | 2/2002 | Kuriyama et al. | 210/748 |
| 2002/0036174 A1 | 3/2002 | Kawaguichi et al. | 210/748 |
| 2002/0068845 A1 | 6/2002 | Kato et al. | 588/210 |
| 2002/0103409 A1 | 8/2002 | Kuriyama et al. | 588/227 |
| 2002/0130030 A1 | 9/2002 | Kato et al. | 204/157.15 |
| 2002/0163135 A1 | 11/2002 | Kato et al. | 277/459 |
| 2002/0189929 A1 | 12/2002 | Kato | 204/157.15 |
| 2003/0089595 A1 | 5/2003 | Kato et al. | 204/157.3 |
| 2003/0164286 A1 | 9/2003 | Kato et al. | 204/157.15 |
| 2003/0196886 A1 | 10/2003 | Kato et al. | 204/158.21 |

FOREIGN PATENT DOCUMENTS

| | | |
|---|---|---|
| DE | 44 00 308 A1 | 7/1995 |
| EP | 0 581 216 A1 | 2/1994 |
| EP | 0 841 305 A2 | 5/1998 |
| EP | 0 968 739 A1 | 1/2000 |
| EP | 1 005 881 A1 | 6/2000 |
| JP | 49-45027 | 4/1974 |
| JP | 51-23467 | 2/1976 |
| JP | 57-166175 | 10/1982 |
| JP | 60-261590 | 12/1985 |
| JP | 62-191025 | 8/1987 |
| JP | 62-191095 | 8/1987 |
| JP | 63-218293 | 9/1988 |
| JP | 1-180293 | 7/1989 |
| JP | 2-243501 | 9/1990 |
| JP | 3-38297 | 2/1991 |
| JP | 3-074507 | 3/1991 |
| JP | 5-115722 | 5/1993 |
| JP | 5-149127 | 6/1993 |
| JP | 5-269374 | 10/1993 |
| JP | 6-31135 | 2/1994 |
| JP | 6-71130 | 3/1994 |
| JP | 6-182151 | 7/1994 |
| JP | 6-246133 | 9/1994 |
| JP | 7-819 | 1/1995 |
| JP | 7-51675 | 2/1995 |
| JP | 7-144137 | 6/1995 |
| JP | 8-759 | 1/1996 |
| JP | 8-104665 | 4/1996 |
| JP | 8-141367 | 6/1996 |
| JP | 8-243351 | 9/1996 |
| JP | 8-257570 | 10/1996 |
| JP | 8-281271 | 10/1996 |
| JP | 9-10554 | 1/1997 |
| JP | 9-234338 | 9/1997 |
| JP | 9-299753 | 11/1997 |
| JP | 10-180040 | 7/1998 |
| JP | 2000-354642 | 12/2000 |
| JP | 2001-975 | 1/2001 |
| WO | WO 94/02423 | 2/1994 |
| WO | WO 94/03399 | 2/1994 |

OTHER PUBLICATIONS

"Present Status Groundwater/Soil Contamination and Management," *Res. Inst. Env. Techn.* (1995) 220-227 (with translation), no month given.

Ute Heinz et al., "Biodegradation of Dichloroacetic Acid by Entrapped and Absorptive Immobilized *Xanthobacter Autotrophicus* GJ10," 40 *Appl. Microbiol. Biotechnol.* 158-164 (1993), no month given.

Abstract of JP 2000-354642 (Dec. 26, 2000).

Abstract of JP 2001-975 (Jan. 9, 2001).

European Search Report dated Feb. 27, 2003 in European Application No. 02025071.8.

G. Huybrechts et al., "Gas-Phase Chlorine-Photosynthesized Oxidation of Trichloroethylene," 62 *Trans. Faraday Soc.* 2191-2199 (1962), no month given.

K.L. Müller et al., "Die Phtochemische Durch Chlor Sensibillsierte Oxydation von Trichloräthylen zu Dichloracetylchlorid," B37 *H.Z. Phys. Chem.* 365-373 (1937) (With English Translation), no month given.

\* cited by examiner

METHOD OF TREATING SUBSTANCE TO BE DEGRADED AND ITS APPARATUS

BACKGROUND OF THE INVENTION

1. Field of the Invention

The present invention relates to a method of treating a substance to be degraded and apparatus for its practice.

2. Description of the Related Art

In recent years, a large quantity of organic chlorinated compounds such as chlorinated ethylene and chlorinated methane have been used, as industrial technologies have been developed. Disposal of these compounds has become a serious problem, because their release into the environment as spent gases arises wide-spread contamination. To solve this problem, enormous efforts have been made.

One of the disposal methods involves, for example, adsorbing contaminants such as the organic chlorine compounds in an adsorbent such as activated carbon to remove the contaminants from the environment. The activated carbon into which the contaminants are adsorbed is regenerated by burning or heating with a steam, and is then recovered as a liquid containing the contaminants. Another known decomposition method involves degrading chlorinated ethylene using an oxidizer and a catalyst. Specifically, Japanese Patent Laid-Open No. 3-38297 describes a method of degrading the contaminants with ozone, and Japanese Patent Laid-Open No. 63-218293 describes a method of irradiating the contaminants with ultraviolet light under hydrogen peroxide. Also, it has been suggested to use sodium hypochlorite as the oxidizer. Japanese Patent Laid-Open No. 7-144137 describes a method of degrading the contaminants using light irradiation by suspending a photocatalyst comprising oxide semiconductor particles such as titanium oxide and liquid chlorinated ethylene under alkali conditions.

In addition, a photolysis method has been attempted in which ultraviolet light is radiated in a gas phase without using the oxidizer. Japanese Patent Laid-Open No. 62-191025 suggests a method of making an organic chlorine compound harmless by irradiating an exhaust gas containing this compound with ultraviolet light to provide an acidic decomposed gas and then washing it with an alkali solution. Japanese Patent Laid-Open No. 62-191095 suggests an apparatus for aerating a waste water containing an organic halogen compound, irradiating a discharged gas with ultraviolet light, and washing it with an alkali solution. Japanese Patent Laid-Open No. 8-257570 describes a degradation of chlorinated ethylene with iron powder. In this case, it may be a reduction degradation. As to the degradation of tetrachloroethylene (hereinafter referred to as "PCE") using silicon particles, a reduction degradation of PCE has been reported.

It is known that chlorinated aliphatic hydrocarbons such as trichloroethylene (hereinafter referred to as "TCE") and PCE can be degraded aerobically or anaerobically with microorganisms. It has been attempted to degrade or purify these compounds utilizing such a technique.

If the soil is contaminated with these various organic chlorine compounds, the environment is affected for a long period of time. There is therefore a great need to remove the contaminants and recover the soil.

Various decontamination attempts have been made. For example, the contaminants in the soil were suctioned using a vacuum pump and treated with activated carbon. Also, a bioremediation utilizing microorganisms and a degradation method employing ultraviolet light has been proposed.

In the vacuum suction method, the contaminants are removed through adsorption to the activated carbon. However, an adsorption efficiency of the activated carbon is low and it is difficult to treat substances with a high water content. In addition, the spent activated carbon into which the contaminants are adsorbed must be reprocessed.

In the bioremediation, degradation activity of the microorganisms is not necessarily stable, and controlling the degradation is sometimes relatively difficult. The problem of soil contamination by organic chlorine compounds is yet to be solved in practice.

To solve the above-mentioned problems, there is proposed an apparatus for degrading and purifying gaseous organic chlorine compounds by combining a chlorine-containing gas with the gaseous organic chlorine compound and irradiating the combined gases with light.

In such an apparatus, a chlorine gas produced from a chlorine-containing solution is used as a convenient and safe source for obtaining the chlorine-containing gas.

FIG. 1 is a schematic view of one embodiment. A means for producing a chlorine-containing air 11 comprises a water tank for storing a chlorine-containing solution 12, a pipe 13 for blowing an air to the solution, and a valve 14 for adjusting the amount of the air. The air passed through the chlorine-containing liquid contains the chlorine gas and is sent to a reaction vessel 5. A device for providing a substance to be degraded 1 introduces the substance into the reaction vessel 5. In the reaction vessel 5, the substance to be degraded is mixed with the chlorine gas-containing air. The mixed gases are irradiated with light for a predetermined time by a light irradiating means 4, whereby the substance is degraded. After the degradation, the gases are discharged via an exhaust pipe 6. As the chlorine solution in the water tank 12, there is used a solution having a hydrogen ion concentration (pH value) of 1 to 4 and a residual chlorine concentration of 5 to 150 mg/L. Such a solution can be obtained, for example, by dissolving a hypochlorite such as sodium hypochlorite and potassium hypochlorite in water. If the solution contains an inorganic acid and the like, the chlorine gas can be effectively produced.

Japanese Patent Laid-Open Nos. 9-299753 and 10-180040 disclose a light degradation apparatus utilizing a phenomenon that ultraviolet rays UV-B and C degrade a part of the contaminant.

The aforementioned apparatus for degrading and purifying the gaseous organic chlorine compounds degrades them by mixing with the chlorine gas provided from the chlorine-containing water. However, the contaminants are not rendered fully harmless. Rather, most of them are discharged as toxic substances. It is therefore required to further degrade and render harmless the degraded products after light degradation.

Environmental considerations are especially important in a recovery site of the contaminated soil. It is essential to prevent a discharge of the chlorine gas into the environment and purify the waste water.

As described above, various methods of degrading the organic chlorine compounds have been proposed. However, they may require complex devices for degradation and further processing to render the degraded products harmless. Accordingly, this leads to a conclusion that an art of degrading the organic chlorine compounds using an environmentally benign and practical apparatus without requiring special equipment is required. In other words, there is a need to provide a more convenient and efficient degradation method, and a degradation apparatus. Also, there is a need to provide an efficient degradation method without a treatment with activated carbon or microorganisms that does not result in a secondary contamination and produces less waste water, and an efficient degradation apparatus for using the degradation method.

SUMMARY OF THE INVENTION

One aspect of the present invention is a method of treating a substance to be degraded comprising the steps of: degrading the substance to be degraded; contacting a product obtained in the degrading step with a liquid; and entrapping a component of the product not entrapped into the liquid in the contacting step into a medium by contacting the component with the medium.

Another aspect of the prevent invention is an apparatus for treating a substance to be degraded comprising: a means for degrading the substance to be degraded; a means for contacting a product obtained in the degrading step with a liquid; and a means for entrapping a component of the product not entrapped into the liquid in the contacting step into a medium by contacting the component with the medium.

Further objects, features and advantages of the present invention will become apparent from the following description of the preferred embodiments with reference to the attached drawings.

DESCRIPTION OF THE PREFERRED EMBODIMENTS

A basic structure of the apparatus for degrading the substance to be degraded according to the present invention will be described below.

Degradation Reaction (1) Apparatus Structure

Figure 1:
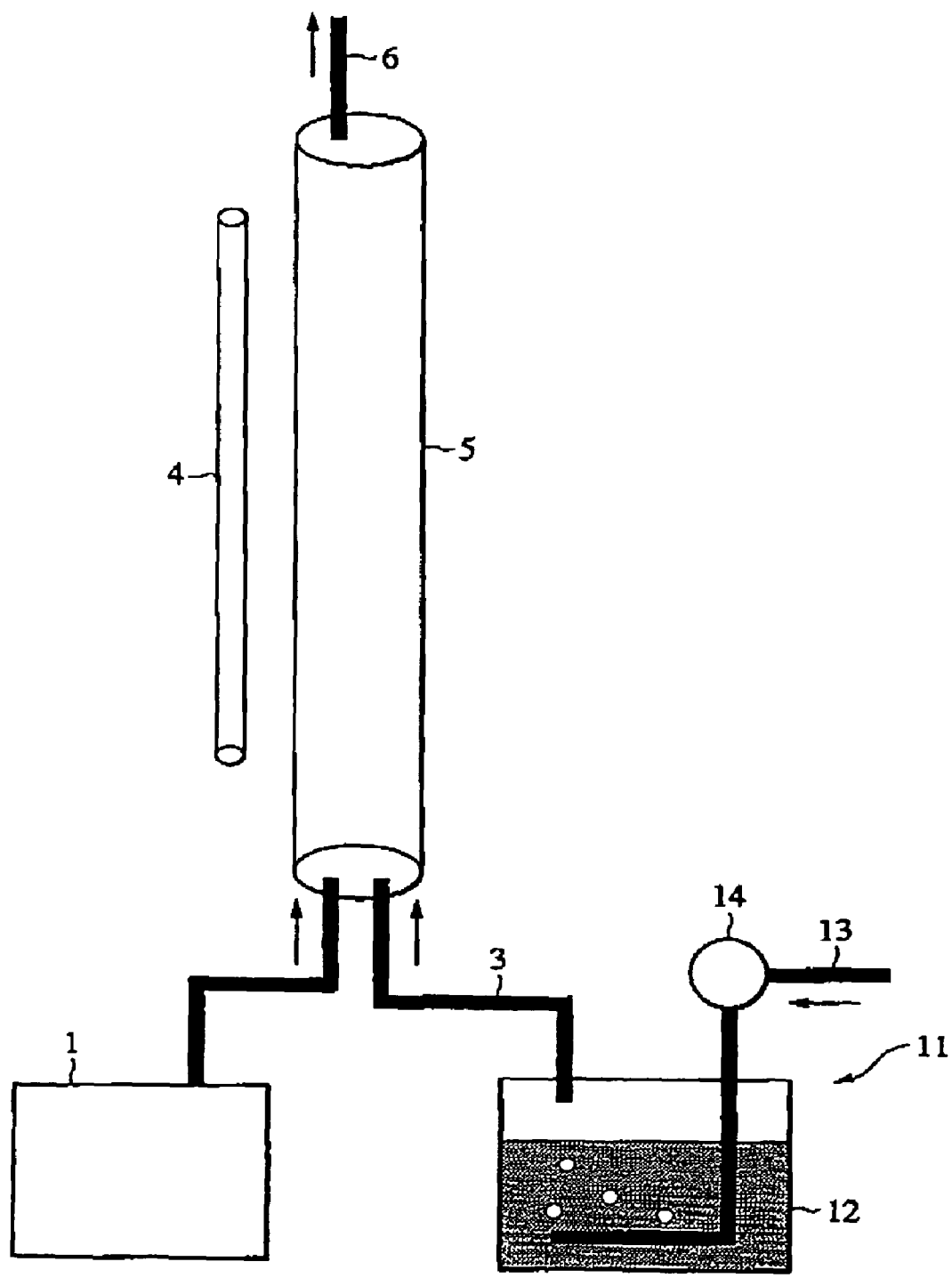
FIG. 1 is a schematic view of a conventional degradation apparatus for degrading a substance to be degraded.
Figure 2:
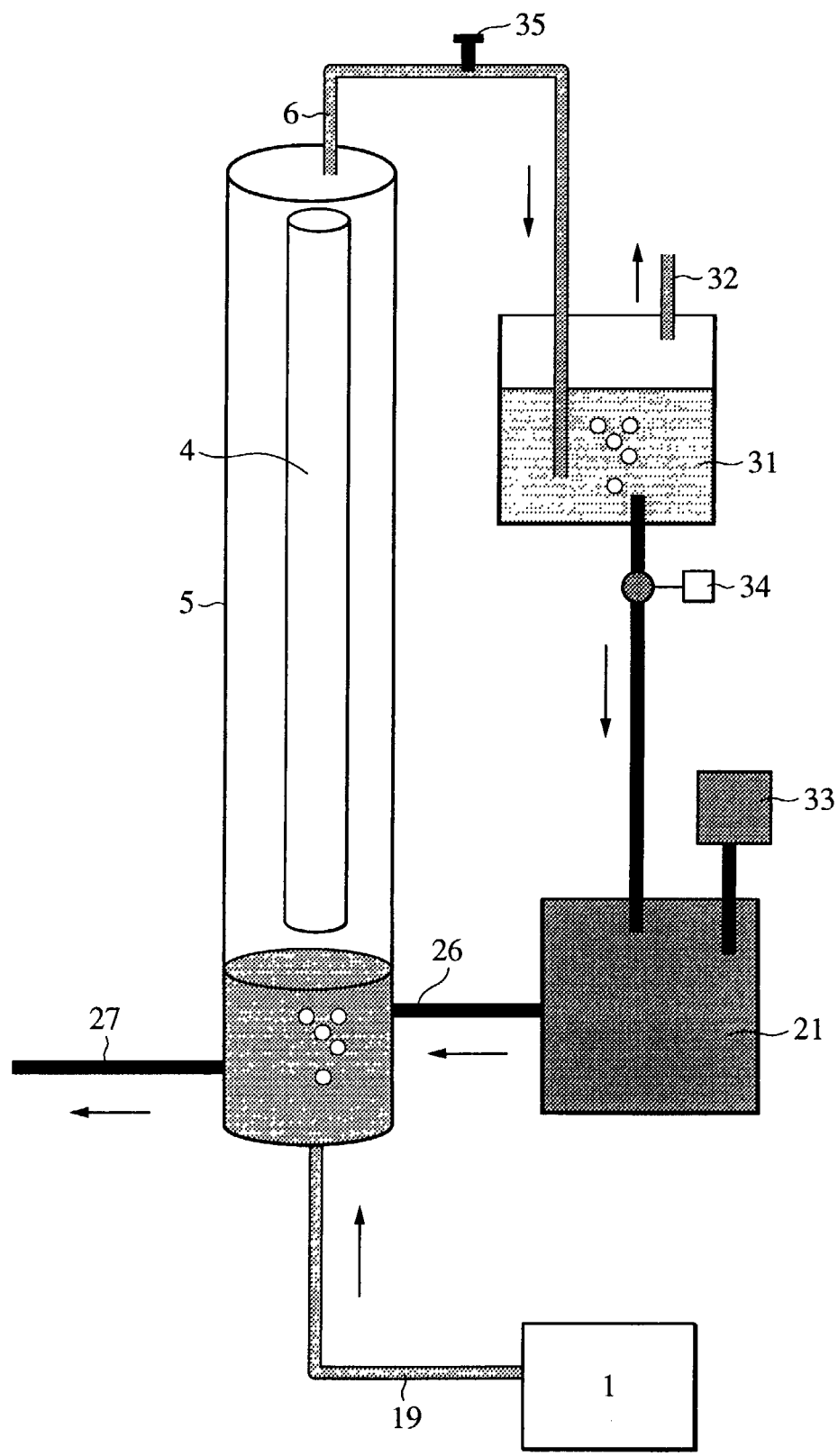
FIG. 2 is a schematic view of a degradation apparatus of Reference Embodiment 1 in relation to the present invention.

In FIG. 2, a reaction vessel 5 has a bottom part for storing a chlorine-containing solution (chlorine solution), and an upper part, i.e., a gas phase part, for mixing a chlorine-containing air and a gaseous organic chlorine compounds to be degraded. The reaction vessel 5 is light-irradiated by a light irradiation means 4.

The gaseous organic chlorine compounds to be degraded are provided by a means for providing the substance to be degraded 1. The chlorine solution is provided continuously via a pipe 26 to the bottom part of the reaction vessel 5 at a desired flow rate. The chlorine solution is prepared in a tank for the chlorine solution 21. A gas for aeration contains the gaseous organic chlorine compounds to be degraded, and is provided continuously via a feed pipe 19 to the bottom part of the reaction vessel 5 at a desired flow rate. As a result, the mixed gases containing the chlorine-containing gas and the gaseous organic chlorine compounds to be degraded are discharged to the upper gas phase part of the reaction vessel 5. The mixed gases in the reaction vessel 5 are light-irradiated by the light irradiation means 4 to degrade the compounds to be degraded.

(2) Chlorine Solution or Functional Water

The chlorine solution (functional water) for use in the present invention has a hydrogen ion concentration (pH value) of 1 to 4, preferably 2 to 3, and a residual chlorine concentration of 5 to 300 mg/L, preferably 30 to 120 mg/L.

It is desirable that the residual chlorine concentration be within the above ranges, the chlorine-containing water (functional water) be stored in the bottom of the tank, the air aerated therethrough contain the contaminants, and a means for aeration also function as a means for mixing the chlorine-containing air and the contaminants-containing air in the means for producing a chlorine-containing air as shown in FIG. 2.

The chlorine solution having the above-defined properties can be prepared from reagents such as hypochlorite and the like. For example, the chlorine solution can be obtained using 0.001 to 0.1 mol/L of hydrochloric acid, 0.005 to 0.02 mol/L of sodium chloride, and 0.0001 to 0.01 mol/L of sodium hypochlorite.

Hydrochloric acid and the hypochlorite are used to prepare 2000 mg/L of a chlorine solution having a pH of 4.0 or less and a chlorine concentration of 2 mg/L or more. For example, the chlorine solution can be obtained using 0.001 to 0.1 mol/L of sodium hypochlorite, and 0.0001 to 0.01 mol/L of sodium hypochlorite.

Instead of the above-mentioned hydrochloric acid, other inorganic acids or organic acids may be used. Examples of the inorganic acid include hydrofluoric acid, sulfuric acid, phosphoric acid, and boric acid. Examples of the organic acid include acetic acid, formic acid, malic acid, citric acid, and oxalic acid. Alternatively, the chlorine solution can be prepared using a weak acidic watery powder product, for example, manufactured by Clean Chemical Co., Ltd. under the trade name of "Quino-San 21X", i.e., $N_3C_3O_3NaCl_2$.

The chlorine solution having the properties described above can be obtained at an anode by dissolving an electrolyte such as sodium chloride and potassium chloride in raw water and electrolyzing the water in a water tank including a pair of electrodes.

The concentration of the electrolyte, i.e., sodium chloride, in the raw water before electrolysis is preferably 20 to 2000 mg/L, more preferably 200 to 1000 mg/L.

When a diaphragm is disposed between the pair of electrodes, it can prevent mixing the acidic water produced near the anode and alkali water produced near the cathode.

As the diaphragm, an ion exchange membrane and the like can be suitably used. As a means for providing such functional water, commercially available strong acidic electrolyzed water generators, including Oasis Bio Half manufactured by Asahi Glass Engineering Co., Ltd. and Strong Electrolyzed Water Generator Model FW-200 manufactured by Amano Co., Ltd., can be utilized.

The solution is called electrolyzed water, electrolyzed functional water, functional water or the like, and is used for sterilization.

Thus far, a structure has been described in which the chlorine-containing water (functional water) is stored at the bottom of the tank, the air aerated therethrough contains the contaminants, and a means for aeration also works as a means for mixing the chlorine-containing air and the contaminants-containing air in the means for producing a chlorine-containing air as shown in FIG. 2.

As described later, it is desirable in the degradation according to the present invention that the concentration of chlorine be within a certain range. Within this range, the residual chlorine concentration in the chlorine-containing water (functional water) of the means for producing the chlorine-containing air is not necessarily within the above-defined range.

Figure 3:
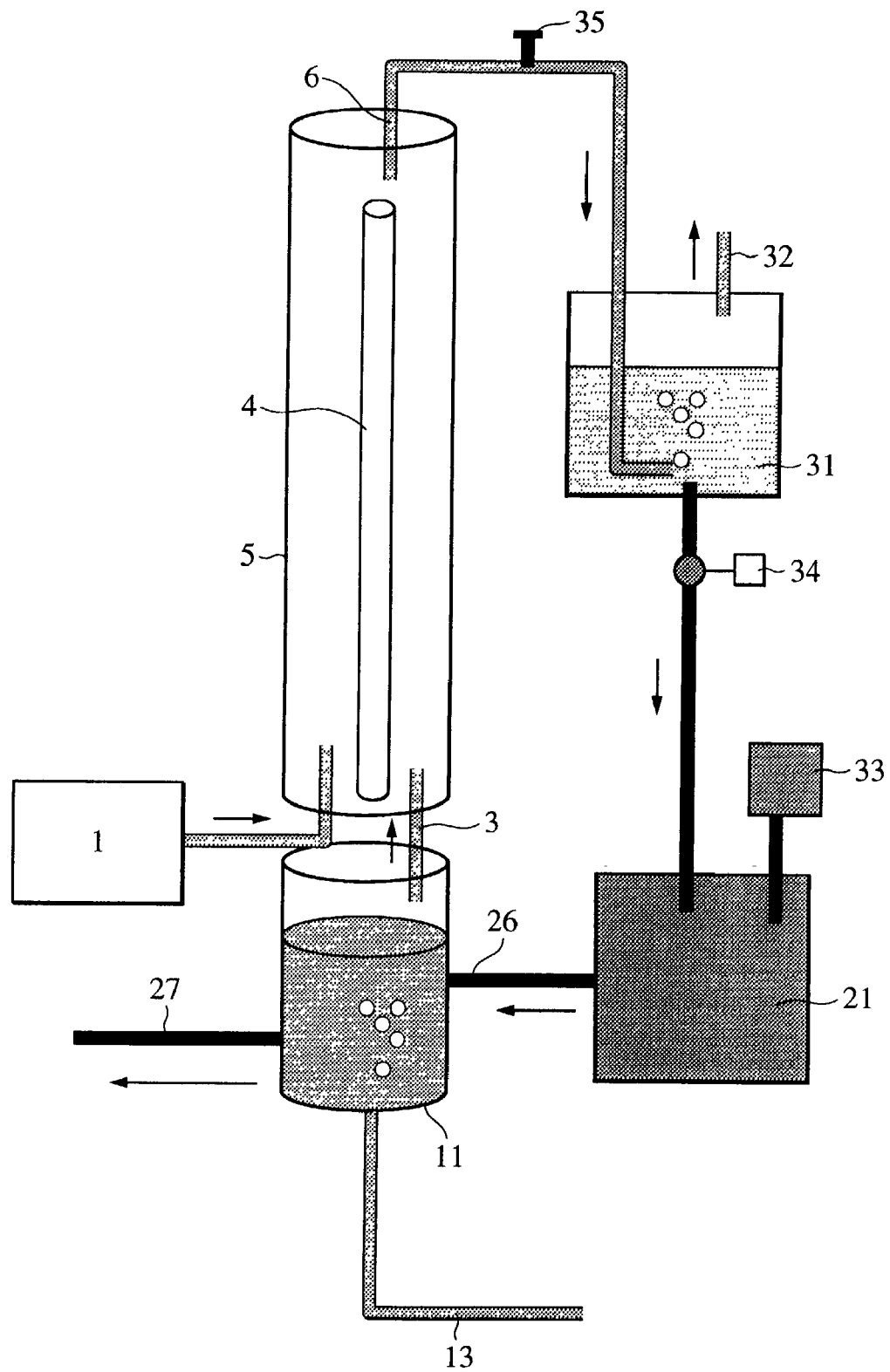
FIG. 3 is a schematic view of a degradation apparatus of Reference Embodiment 2 in relation to the present invention.

For example, when a gas containing no contaminants is introduced into the chlorine-containing water and chlorine gas produced and the contaminants-containing air are mixed as shown in FIG. 3 (Reference Embodiment 3), it is desirable that the residual chlorine concentration be higher.

In other words, in the structure shown in FIG. 3, the chlorine gas produced is diluted with the contaminants-containing air. A ratio of dilution is determined by a ratio of a feed rate of the chlorine gas produced to a feed rate of the contaminants-containing air in a reaction site. For example, if the feed rate of the contaminants-containing air is four times that of the chlorine gas, the chlorine concentration is diluted to ⅕. When the chlorine concentration is decreased, it is needed to keep the chlorine concentration within a certain range. Accordingly, in the structure shown in FIG. 3, it is desirable that the residual chlorine concentration be higher.

The functional water (chlorine solution) having a higher residual chlorine concentration is more easily produced from the reagents than by the electrolysis. Namely, the functional water having a residual chlorine concentration, which is 10 to 50 times higher than that of the functional water obtained by the electrolysis, can be easily obtained. It is debatable whether or not a solution having such a high residual chlorine concentration can be called "functional water". According to the present invention, such a solution is the functional water. When the functional water having the high residual chlorine concentration is prepared with the reagents, for example, hydrochloric acid and sodium hypochlorite are preferably mixed in a chlorine-producing tank, as opposed to mixing the reagents in advance.

Examples of the raw water for use in the preparation of the chlorine solution include tap water, river water, sea water and the like. Generally, such water has a pH of 6 to 8 and a chlorine concentration of less than 1 mg/L at most. Such raw water is not able to degrade the above-mentioned organic chlorine compounds, as might be expected. Consequently, the functional water is the chlorine-containing solution that can produce chlorine gas as described later, and is not characterized by its production method.

(3) Concentration of Chlorine Gas and Chlorine-Gas Producing Means

The above-described chlorine solution, i.e., the functional water, can produce the chlorine gas that is required for degradation. For example, air is aerated into the functional water to provide the chlorine gas-containing air. The chlorine gas-containing air and the gas to be degraded are mixed and irradiated, whereby the contaminants can be degraded.

Alternatively, the contaminants-containing air may be aerated into the functional water to provide a mixture of the gas to be degraded and chlorine gas. In this case, the chlorine gas with a relatively high concentration can be obtained.

As to the mixing ratio of the gas to be degraded to the chlorine gas-containing gas, it is preferable that the concentration of the chlorine gas in the gases be adjusted within the range of 20 to 500 ppmV. When the chlorine gas in the mixed gases has the concentration of 50 to 200 ppmV, the gas to be degraded is degraded very efficiently depending on the concentration of the gas to be degraded.

(4) Means for Aerating Functional Water

An air diffuser (bubbler) can be used to aerate the contaminants-containing gas and/or gas for aeration into the functional water. Although a normal air diffuser for blowing a gas into a liquid may be used, it is desirable that the air diffuser be selected such that air bubbles have sufficient surface areas for chlorine diffusion.

A material of the air diffuser is desirably not reacted with components of the functional water. Examples include a porous, filtrous plate made of sintered glass, porous ceramics, sintered SUS 316, a net woven with fibrous SUS 316 or the like; and a sparger made of glass, SUS 316 pipe or the like.

(5) Main Reaction Site in Degradation Step

According to one embodiment of the present invention, air is aerated into the functional water to produce the chlorine-gas containing air that is required for degradation. The aeration of air into the functional water plays a fundamental role in providing the chlorine gas that is required for degradation. A gas phase reaction in a tank is for a further processing and a degradation reaction is a main reaction.

Accordingly, when the production of chlorine and the degradation reaction are integrated, a ratio of a gas phase part to a liquid phase part significantly affect the degradation ability. If the functional water has an increased volume, the amount of chlorine that can be fed increases, but the gas phase decreases, resulting in a decreased reaction site. In contrast, if the gas phase part increases, the reaction site increases and the degradation reaction proceeds quickly, but the liquid phase part decreases, resulting in the decreased chlorine feed.

There are various factors that affect degradation such as aeration speed and feed speed. When the production of the chlorine-containing air and the degradation reaction area (processing area) are integrated, a percentage of the liquid phase is 5 to 30%, preferably 10 to 20%. When they are not integrated, a ratio of the volume of the tank that produces the chlorine-containing air to the volume of the tank for the degradation reaction is desirably about 1:2 to 1:9.

(6) Substance to be Degraded

The substance to be degraded is an organic chlorine compound such as chlorinated ethylene, chlorinated methane. Examples of the chlorinated ethylene include 1 to 4 chlorine-substituted ethylene, i.e., chloroethylene, dichloroethylene (DCE), trichloroethylene (TCE), and tetrachloroethylene (PCE). Examples of the dichloroethylene include 1,1-dichloroethylene (vinylidene chloride), cis-1,2-dichloroethylene, and trans-1,2-dichloroethylene. Examples of the chlorinated methane include a chlorine-substituted methane such as chloromethane, dichloromethane, and trichloromethane.

The contaminants containing the organic chlorine compounds to be degraded are not especially limited. The present invention can be applicable to purification of waste water and waste gas from paint and dry cleaning factories, and soil and ground water contaminated with the contaminants. For example, the present invention is utilized to remove the contaminants contained in a gas produced upon air stripping, or a vacuum extracted gas from contaminated soil.

(7) Light Irradiation Means

The light irradiation means for use in the present invention preferably emits light having a wavelength of 300 to 500 nm, more preferably 350 to 450 nm. As to light irradiation intensity, a light source having a peak around 360 nm can fully degrade the gases at hundreds $\mu W/cm^2$ (measured within 300 to 400 nm).

Since ultraviolet light having a wavelength of about 250 nm or less that significantly and adversely affects the human body is not required according to the present invention, glass and plastic can be used as the reaction vessel.

As the light source, there can be used natural light such as sunlight, and artificial light such as a mercury lamp, a black light, a color fluorescent lamp, and a short wavelength (500 nm or less) light emitting diode.

(8) Degradation Reaction Mechanism

The present inventors already found that the degradation of the organic chlorine compounds proceeded upon light irradiation and contact with chlorine gas. However, the reaction mechanism is not yet clearly explained. It is known that chlorine dissociates to form free radicals when it is irradiated with light having a wavelength within a specific range. It is believed that in the present invention the chlorine radicals are produced by light irradiation, and that these radicals reacted with the substance to be degraded to break its constituent bonds.

In the reaction according to the present invention, oxygen is essential. Oxygen can be on the form of oxygen radicals produced by degradation of chlorine and water and oxygen, that normally exists in air.

(9) Means for Entrapping or Trapping Chlorine: Alkali Solution

In order to fully degrade the substance to be degraded in a short time, it is desirable to provide an excess amount of chlorine exceeding the required amount for degradation. Accordingly, the purified gas exhausted from the exhaust pipe 6 contains chlorine. The chlorine is collected and recovered by a means for entrapping chlorine 31. In the means for collecting chlorine, the alkali solution is contacted with the purified gas containing chlorine exhausted from the pipe 6. The chlorine is entrapped into the alkali solution, and purified air containing no chlorine is exhausted from an exhaust pipe 32.

Any means may be used for contacting the alkali solution with the purified exhausted gas containing chlorine. For example, it is desirable that the purified gas containing chlorine be introduced or aerated into the alkali solution to increase the contact between the gas and the liquid.

The alkali solution for entrapping chlorine can be obtained at an cathode by dissolving the aforementioned electrolyte such as sodium chloride and potassium chloride into raw water, and electrolyzing the water in a water tank including a pair of electrodes. The solution is called as alkali ion water, which is effective for health and beauty. The production apparatus thereof is commercially available.

As the alkali solution for use entrapping chlorine, a sodium hydroxide solution, a calcium hydroxide solution, a calcium carbonate solution and the like can be used. Its concentration may be set depending on the chlorine amount to be collected. The pH is preferably 8 to 12.

As the operation is continued, the pH of the alkali water in the means for entrapping the chlorine 31 decreases. The pH is desirably 8 or more. In any case, care should be taken so that the chlorine gas is not exhausted from the exhausted pipe 32.

After the operation is continued for a predetermined duration, the residual chlorine concentration of the alkali solution in the means for entrapping the chlorine 31 is measured. When the residual chlorine concentration reaches a predetermined concentration, i.e., 5 to 1000 mg/L, desirably 30 to 120 mg/L, the solution is sent to the tank for the chlorine solution 21, and then can be used again to produce the chlorine-containing air.

At this time, it is required to adjust the pH in the tank for the chlorine solution 21. The pH is adjusted by providing an acid from a means for providing an acid 33. It is desirable to adjust the pH within the range of 1 to 4, especially 2 to 3. As the acid solution for use in the pH adjustment, at least one inorganic or organic acid selected from the group consisting of hydrochloric acid, hydrofluoric acid, oxalic acid, sulfuric acid, phosphoric acid, boric acid, acetic acid, formic acid, malic acid, and citric acid can be used.

Thus, the chlorine solution prepared in the tank for the chlorine solution 21, i.e., the functional water (II), can be used again for providing the chlorine gas for degradation.

The above steps are repeated to effectively realize the degradation and purification treatment utilizing chlorine.

Several structures can be considered to operate the means for entrapping the chlorine. Any structure may be used. For example, there is a basic batch system as described above, a continuous system as described later, or a batch and continuous combination system.

Figure 6:
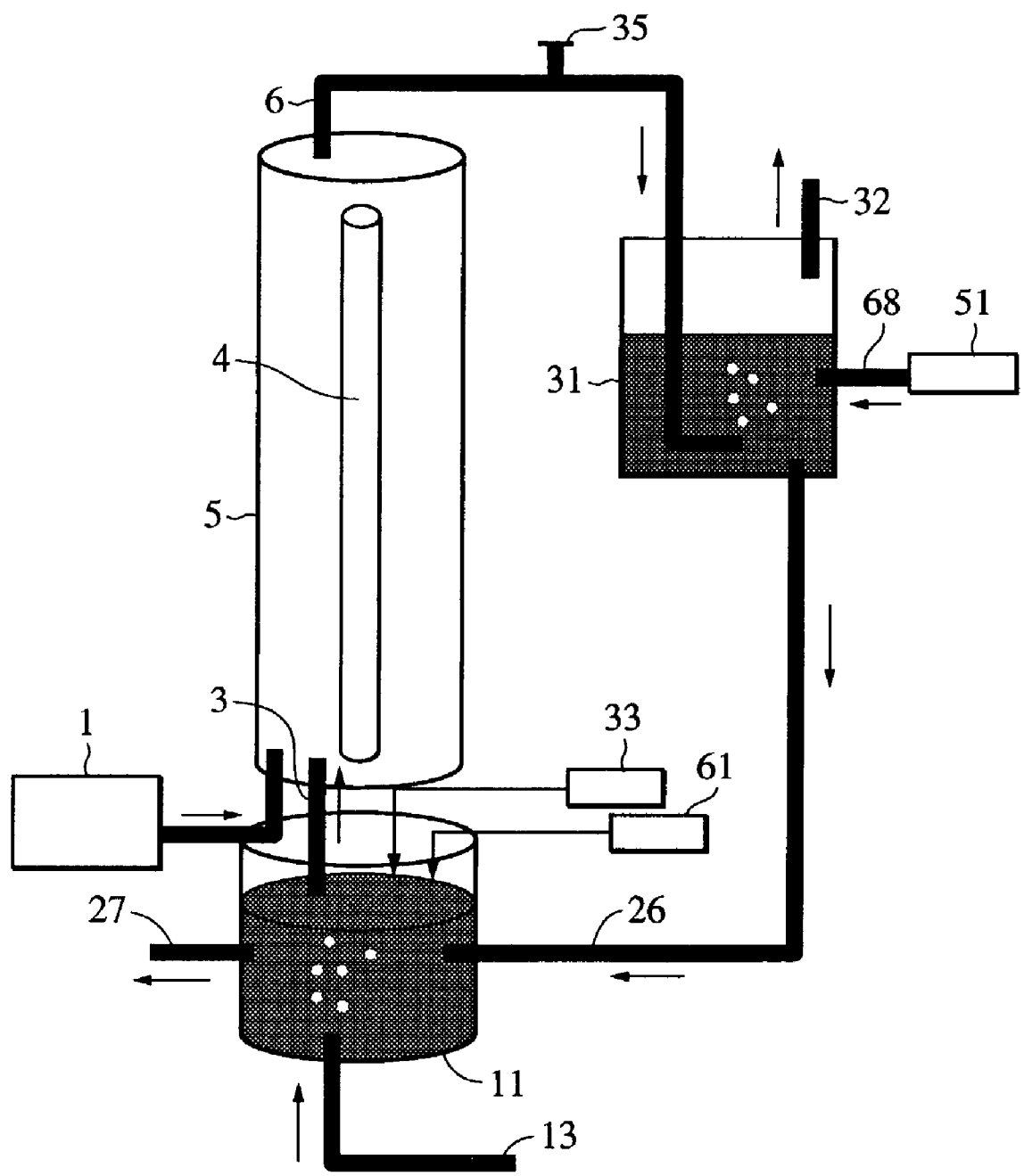
FIG. 6 is a schematic view of a degradation apparatus of Reference Embodiment 6 in relation to the present invention.

FIG. 6 shows a structure in which the chlorine recovered in the liquid is continuously sent to the tank for producing the chlorine gas 11. In other words, the alkali chlorine-containing water is provided continuously as recovered chlorine-containing water from the means for entrapping the chlorine 31 via the pipe 26.

When the alkali solution is provided to the means for entrapping the chlorine 31 via an alkali water feed pipe 62 at a constant speed, the state of the solution becomes stable after the predetermined time has elapsed. As a result, the alkali solution containing approximately constant concentration of chlorine is passed through the pipe 26.

The chlorine concentration of the solution provided to the tank for producing the chlorine gas 11 can be controlled by adjusting the amount of the alkali solution provided and the amount of the chlorine-containing gas after degradation. The chlorine concentration of the alkali solution provided is proportional to a value obtained by dividing the chlorine-entrapping amount per unit time in the alkali solution by the amount of the alkali solution provided per unit time. For example, if the chlorine-entrapping amount per unit time is constant and the amount of the alkali solution provided is decreased, the chlorine-containing solution with minor amounts and high concentration can be sent to the tank for producing the chlorine gas 11.

Thus, the residual chlorine concentration of the alkali solution from the means for entrapping the chlorine 31 can be, for example, as high as about 20000 mg/L. It is desirable that the residual chlorine concentration be 1000 to 10000 mg/L. As the concentration increases, the amount of the solution provided can be decreased, and the total amount of the waste water can be decreased. The concentrated solution exhibits properties similar to those of a hypochlorous acid solution. The solution is sent to the tank for producing the chlorine gas 11 and can be used again for producing the chlorine-containing air.

In other words, the chlorine-containing solution recovered in the liquid is continuously sent to the tank for producing the chlorine gas 11, the shortage of the chlorine is replenished from a means 61 in some cases, and the pH concentration is adjusted using a means for providing an acidic solution 33, whereby the functional water (II) is produced in the tank for producing the chlorine gas 11. The solution is aerated to produce the chlorine-containing gas for use in the degradation.

(10) Processing of Product Produced by Degrading Substance to be Degraded

Figure 8:
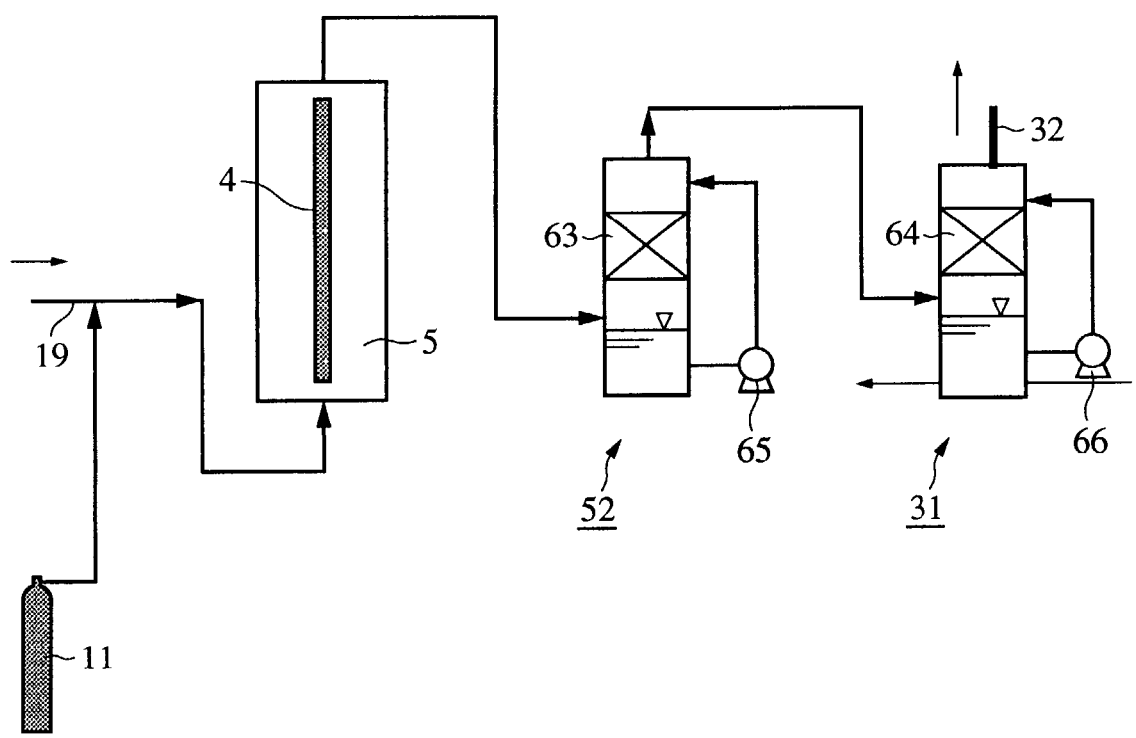
FIG. 8 is a schematic view of a degradation apparatus of embodiment 1 according to the present invention.

FIG. 8 is a schematic diagram that the product produced by degrading the substance to be degraded is contacted with a liquid, the product is entrapped into the liquid, components not entrapped in the liquid are contacted with a medium, and the components are entrapped in the medium. For example, acidic substances in the degraded product are entrapped in the liquid, and chlorine and the like not entrapped in the liquid are entrapped into the medium. A gas containing the substance to be degraded is introduced into the reaction vessel 5 via the pipe 19. In the reaction vessel 5, the light irradiating means 4 is disposed to promote degradation. As the means for producing the chlorine-containing air (tank for producing the chlorine gas) 11, a chlorine cylinder is used in the FIG. 8, but it is not especially limited thereto. The light irradiating means 4 uses the black light fluorescent lamp containing no light having a wavelength of 300 nm or less. Therefore, it requires the means for producing the chlorine-containing air (tank for producing the chlorine gas) 11. However, if light having a wavelength of 254 nm is, for example, used for the degradation, the means for producing the chlorine-containing air (tank for producing the chlorine gas) 11 is not necessary.

As a means for entrapping the acidic substances 52, a gas-liquid contact tower is used to contact a gas with a liquid. The gas degraded by the light irradiation is introduced into the means for entrapping the acidic substances 52. The solution in the gas-liquid contact tower is circulated by discharging the solution from the top of the gas-liquid contact tower with a pump 65. The gaseous products introduced into the gas-liquid contact tower and the solution circulated are facilitated to be contacted mainly in packed materials 63, and are released into a bottom storing part of the gas-liquid contact tower. The acidic substances produced by the degradation are transferred to the solution. Because the solution is circulated by the means for entrapping the acidic substances 52, the concentration of the acidic substances in the solution increases. Although chlorine contained in the degraded gas is in contact with the solution in the means for entrapping the acidic substances 52, most chlorine does not remain and is exhausted, since the solution is acid.

The exhausted chlorine-containing gas is sent to the means for entrapping the chlorine 31, and is contacted with an alkali solution such as a sodium hydroxide solution. Chlorine is absorbed in the solution, and the purified gas is exhausted from the exhaust pipe 32. There is provided the means for trapping the acidic substance 52 before the gas exhausted from the exhaust pipe 6 is introduced into the means for entrapping the chlorine 31. Thus, the acidic substances do not affect the means for entrapping the chlorine 31.

The means for entrapping the chlorine 31 has a structure similar to the means for entrapping the acidic substances 52. In other words, the solution is circulated with a pump 66, and packed materials 64 facilitates the gas-liquid contact. In the means for entrapping the chlorine 31, there is provided feed and drainage pipes to inhibit an increase in the chlorine concentration in the solution. The apparatus is for degrading the toxic gas and converting the toxic gas to a solution that is easily handled. From the viewpoint of the above, the apparatus is advantageous in that the gas is liquefied at lower energy cost and is degraded compared to the conventional apparatus that absorbs the toxic gas with activated carbon, and recovers toxic substances as the solution with steam desorption. In the apparatus for use in the present invention, the concentration of the degraded product in the solution in the means for entrapping the acidic substances 52 may reach tens %, i.e., 20 to 90%.

Figure 9:
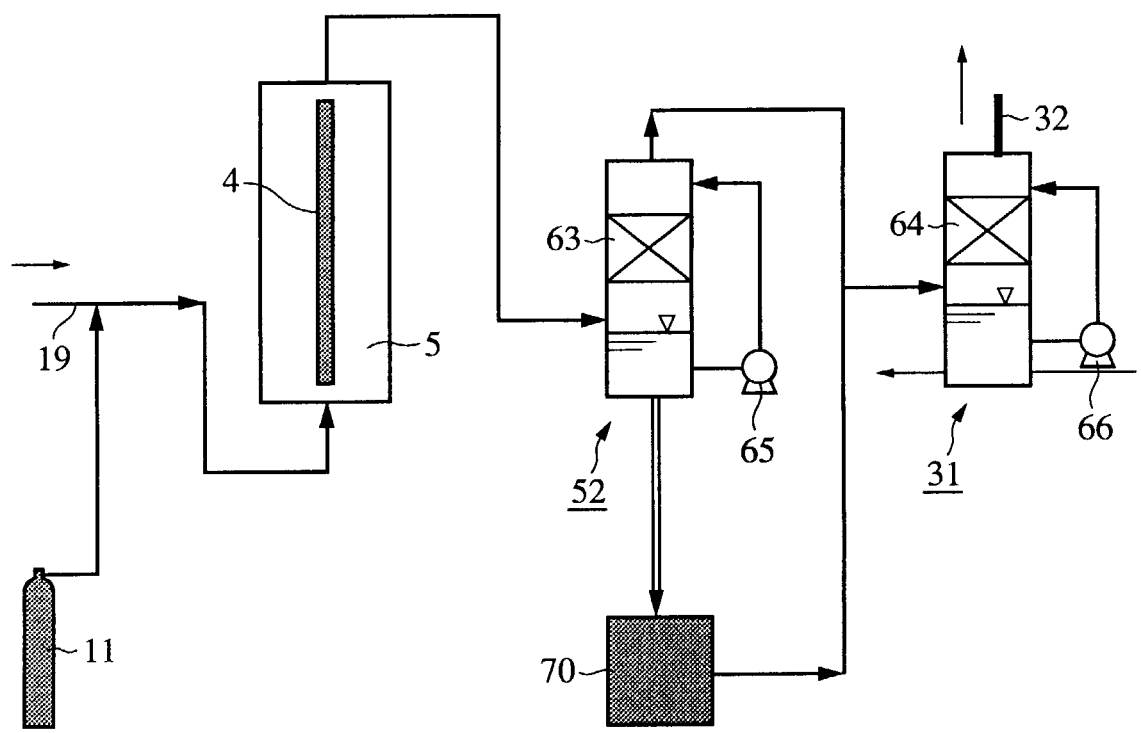
FIG. 9 is a schematic view of a degradation apparatus of embodiment 2 according to the present invention.

As shown in FIG. 9, the degraded product entrapped into the solution in the means for entrapping the acidic substances 52 may be degraded with a degrading means 70. Any degrading means can be used, which includes microorganism degradation, electrolysis, catalytic degradation, thermolysis, and incineration. In any case, the higher the concentration, the higher the efficiency of the degradation.

(11) Apparatus for Recovering Contaminated Soil

Figure 10:
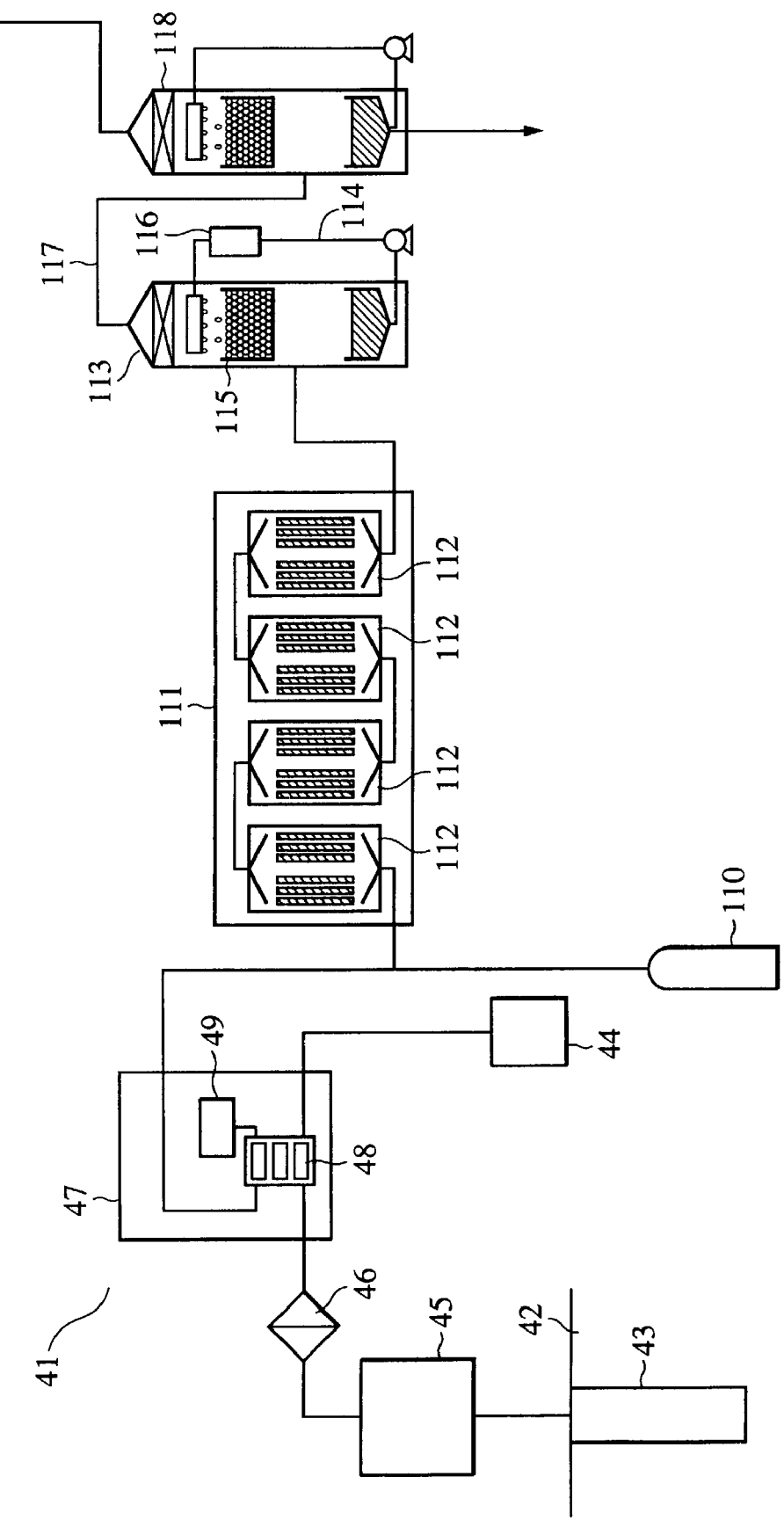
FIG. 10 is a schematic view of a degradation apparatus of embodiment 3 according to the present invention.

FIG. 10 shows a schematic diagram of an apparatus for recovering a contaminated soil 41 according to one embodiment of the present invention. Referring to FIG. 10, a method for using the apparatus for recovering the contaminated soil 41 will be described.

A longitudinal pit 43 is formed in the contaminated soil 42. The contaminants-containing air such as trichloroethylene in the soil is sucked using a vacuum pump 44. A gas-liquid separation unit 45 removes liquid components from the contaminants-containing air sucked with the vacuum pump 44. After a filter 46 removes debris, the contaminants-containing air is sent to a concentrating device 47 at a predetermined flow rate.

The gas sent to the concentrating device 47 is contacted with an adsorbent 48 in the device 47. The contaminants are adsorbed to the adsorbent 48, and the gas is purified. The adsorbent 48 is installed in a circular shape, i.e., a rotor shape, and is rotated at the predetermined speed, whereby the adsorbent 48 passes, alternately, through an adsorption area and a desorption area. That is, the adsorbent on which the contaminants are adsorbed moves from the adsorption area to the desorption area to continuously perform the processing. It is preferable that the flow rate of the gas be 0.1 to 100 m$^3$/min when the contaminants sent to the device 47 is adsorbed. The adsorbent 48 on which the contaminants are adsorbed is passed through a gas heated with a heater 49 to desorb the contaminants from the adsorbent 48 and to discharge them into the gas phase in a gaseous state. Thus, the adsorbent 48 is recovered, and the concentrated contaminants can be obtained. The concentration of the contaminants contained in the gas after the desorption can be higher than that in the gas by adjusting the amount of the heated gas sent to the desorption area and a rotating speed of the adsorbent 48.

The amount of the heated gas sent to the desorption area should be regulated so that a concentration magnification of the contaminants is 2 to 100 times. For example, if the flow rate of the gas is 0.1 m$^3$/min and the concentration of the contaminants should be 2 times greater, the amount of the heated gas sent to the desorption area is to be ½, i.e., 0.05 m$^3$/min. The rotating speed of the adsorbent is to be 10 to 20 rph (revolutions per hour), when the concentration rate of the contaminants should be 20 to 30 times.

The concentrating device may be newly fabricated, or may be commercially available, for example, from Taiki Corporation under the tradename of "Admat." The device is for adsorbing and concentrating a solvent gas. The adsorbent of the device is a mat made by converting fibrous activated carbon into a felt. The mat wound around a cylindrical wire mesh is slowly rotated to sequentially adsorb and desorb the contaminants. A non-treated gas is passed through the mat from the outside to the inside to adsorb the contaminants. Hot air about at 130° C. is passed through the mat from the inside to the outside to desorb the contaminants.

The concentrated gas containing the contaminants is discharged, then combined with chlorine provided from a chlorine cylinder 110, and sent to a light reaction vessel 111 together with the chlorine. The concentrated gas is light-irradiated with the light irradiation means in a reaction area to sequentially degrade the contaminants in the concentrated gas. In the reaction bath, a mixed gas of the contaminants, i.e., trichloroethylene and chlorine, is light-irradiated to degrade the contaminants by the following mechanism:

Cl$_2$+hv(light)→2Cl. (1)

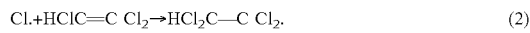
Cl.+HClC=C Cl$_2$→HCl$_2$C—C Cl$_2$. (2)

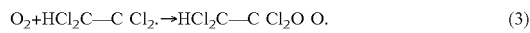
O$_2$+HCl$_2$C—C Cl$_2$.→HCl$_2$C—C Cl$_2$O O. (3)

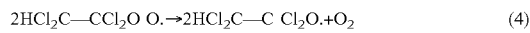
2HCl$_2$C—CCl$_2$O O.→2HCl$_2$C—C Cl$_2$O.+O$_2$ (4)

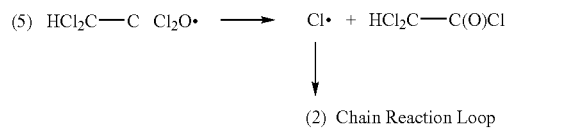
(5) HCl$_2$C—C Cl$_2$O• ⟶ Cl• + HCl$_2$C—C(O)Cl (2) Chain Reaction Loop

HCl$_2$C—C(O)Cl+H$_2$O→HCl+HCl$_2$C—COOH (6)

A chlorine radial (Cl.) is produced by the light irradiation and attacks the substance to be degraded, i.e., trichloroethylene. The trichloroethylene is degraded to dichloroacetic acid. At the same time, chlorine produced from trichloroethylene is also made into a radical and is used for degrading other trichloroethylene molecules. Thus, a sequential chain reaction occurs. When the amount of chlorine introduced into the light reaction tank is small, many substances to be degraded are degraded.

The light reaction tank 111 may be configured to link a plurality of light degrading parts 112 in series. The plurality of light degrading parts 112 communicate in series, and the degrading reaction steps (1) to (6) are repeated in each degrading part. As the gas containing the substance to be degraded, the concentration of chlorine gradually increases. The higher the concentration of chlorine in the degrading part, the more substance to be degraded is degraded. Thus, the substance can be efficiently degraded.

An outlet of one degrading part communicate with an inlet of the other degrading part by a curved passage. The gas containing the substance to be degraded introduced into one degrading part is degraded by irradiating light and contact with chlorine. Depending on the flow rate, the gas containing the substance to be degraded is transferred from the one degrading part to the other degrading part at a high flow rate.

Many substances to be degraded are not degraded, remain unreacted, and may be undesirably exhausted from the outlet before reaching the other degrading part. When the passage communicating the outlet of one degrading part with the inlet of the other degrading part is curved, the flow rate of the gas decreases to induce a turbulent flow of the gas in the first, the two degrading parts. The substance to be degraded and chlorine are well agitated, and the substance can be efficiently degraded.

In respective degrading parts, a plurality of light sources are disposed in the present embodiment. A plurality of irradiating parts in one degrading part may be disposed to solve the aforementioned problem that the mixed gas introduced into the degrading part is not degraded by light and is exhausted from the outlet of the degrading part. The plurality of irradiating parts in the degrading part become obstacles to the passage of the mixed gas of the substance to be degraded and chlorine. The obstacles decrease the flow rate of the gas to induce the turbulent flow of the gas. The substance to be degraded and chlorine are well agitated, and the substance can be efficiently degraded.

The light degradation reaction with chlorine in the light reaction vessel 111 utilizes the light having a wavelength of 315 to 500 nm to make degradation practical. As the light source, there can be used natural light such as sunlight, and artificial light such as a mercury lamp, a black light, and a color fluorescent lamp.

The degraded product produced in the light reaction vessel 111 is, for example, a haloacetic acid such as trichloroacetic acid, dichloroacetic acid, and monochloroacetic acid that are known to be produced upon the light degradation of chloroethylene-based substances. These gaseous degraded products exhausted from the light reaction vessel are introduced into a scrubber 113 at a predetermined flow rate that contacts the gaseous substance to be degraded with a liquid to entrap them in the liquid. The degraded products produced in the light reaction vessel 111 contain the contaminants. For further degradation of the degraded products, the contaminants in the degraded products are required to be entrapped in the liquid.

The liquid is circulated with a pump in the scrubber 113. The liquid is discharged from the top of the scrubber using a connecting pipe 114 for connecting the bottom and the top of the scrubber 113. The liquid contacts with the introduced degraded products to entrap them thereinto. It is preferable that the gas-liquid contact part in which the degraded products contact the liquid have a labyrinth structure provided by a filler 115, for example, manufactured by Tomoe Engineering Co., Ltd. under the tradename of "Tripacks" to result in a long gas-liquid contact time. The organic chlorine compound in the gas to be introduced is easily entrapped in the solution. While the organic chlorine compound is dissolved in the liquid, the liquid absorbing the organic chlorine compound is stored temporarily in the bottom of the scrubber, whereby the circulation is repeated. As the liquid, there is used water or an electrolyte solution such as sodium chloride. An electrolysis tank 116 is disposed at the connecting pipe 114 for connecting the bottom and the top of the scrubber 113. In the electrolysis tank 116, the liquid containing the degraded products is electrolyzed. Chlorine gas and other by-product gases isolated by a redox reaction are discharged together with the liquid to the top of the scrubber 113. The chlorine gas and other by-product gases including hydrogen, oxygen, carbon dioxide, and methane pass through a passage 117 disposed on the top of the scrubber 113 and are sent to a scrubber 118 for entrapping the chlorine in a state that excludes outside air.

The scrubber 118 for entrapping the chlorine has the same configuration as the scrubber 113 except that an alkali solution such as a sodium hydroxide solution is circulated for entrapping the chlorine. The chlorine is contacted with the alkali solution and is entrapped thereinto. The purified gas is exhausted outside of the scrubber. In the solution that entraps chlorine in the scrubber, a part of the chlorine in the solution may be hypochlorous acid. Accordingly, the following steps may be conducted, as required. If the pH is set high for increasing chlorine absorbing ability, a neutralizing step is desirable. If the residual chlorine is detected, a reducing agent such as sodium sulfite may be added to the liquid. In other words, the solution has alkali characteristics after the chlorine is absorbed and the residual chlorine is required to be treated, the neutralizing and reducing steps may be conducted. In order to decrease the amount of chemicals to be used, the reducing step may be conducted after the neutralizing step.

Although the substance to be degraded is mainly the organic chlorine compound in the above description, the present invention can be applied for other substances to be degraded. For example, hydrogen fluoride that is produced by catalytic combustion of a flon based compound is removed by a contact with the liquid. The remaining components can be removed in the subsequent contact step with the medium.

EXAMPLES

Referring to Figures, reference embodiments in relation to the present invention will be described.

Reference Embodiment 1

Referring to FIG. 2, the exemplary reference embodiment proved experimentally will be described below.

A glass column with a volume of 400 mL was used as the reaction vessel 5. 150 mL of a chlorine solution (functional water (I)) were introduced on the bottom of the reaction vessel 5. 150 mL of another chlorine solution (functional water (I)) were stored in a tank for the chlorine solution 21, fed from the tank 21 at a rate of 2 mL/min, and drained from a drainage pipe 27 at a rate of 2 mL/min.

The chlorine solution (functional water (I)) was prepared from hydrochloric acid and sodium hypochlorite. 0.125 mL of a 12% sodium hypochlorite solution (manufactured by Kishida Chemical Co., Ltd.; the concentration of about 12% as received; effective chlorine: min. 5%) and 0.63 mL of hydrochloric acid (35% hydrochloric acid) were added per 100 mL of raw water. Then, the chlorine solution (functional water (I)) had a pH of 2.5 and the residual chlorine concentration of 110 mg/L.

As the light irradiation means 4, a black light fluorescent lamp (manufactured by Toshiba Corporation under the tradename of "FL20S•BLB"; 20W) was used. Its quantity of light was 0.4 to 1.2 mW/cm$^2$. Although the light is within the reaction vessel in the FIG. 2, the light was irradiated from outside of the glass column to the reaction vessel in the experiment.

Concurrently with the light irradiation, an air containing 80 ppm of TCE and 20 ppm of PCE, which was used as the contaminated air that was vacuum sucked from the contaminated soil, produced by a permeator manufactured by Gastec KK, was blown to the bottom of the reaction vessel 5 at a rate of 200 mL/min.

After 30 minutes of operation, the TCE and the PCE in the exhausted gas from the reaction vessel were sampled periodically via a sampling port 35 with a gas tight syringe, and their concentrations were measured using a gas chromatograph (manufactured by Simadzu Corporation under the tradename of "GC-14B" (having a FID detector); column is manufactured by J & W Corporation under the tradename of "DB-624"). No TCE or PCE was detected. After the operation was completed, the TCE and the PCE in the drainage of the chlorine solution were sampled. Again, no TCE or PCE was detected. As a result, it is proved that the TCE and the PCE can be dissolved.

The gas exhausted from the exhaust pipe 6 was blown into the alkali solution containing 120 mL of sodium hydroxide with a pH of 11.2 within the means for entrapping the chlorine 31. At the exhaust pipe 32, the chlorine concentration was measured several times using a detecting tube (manufactured by Gastec KK under the tradename of "No. 8H"), and was 0.5 ppm or less each time.

After 60 minutes of operation while maintaining the above conditions, the pH and the chlorine concentration of the alkali solution in the means for entrapping the chlorine 31 were measured. As a result, the pH was 9.8 and the residual chlorine concentration was 107 mg/L. The gas fed from the permeator was creased, a cock 34 was open to transfer the alkali solution containing chlorine in the means for entrapping the chlorine 31 to the tank for the chlorine solution 21. Using the means for providing an acidic solution 33, 0.06 mL of hydrochloric acid (35%) was added to the tank 21. As a result, the pH was 2.9, and the residual chlorine concentration was 105 mg/L. Then, the means for entrapping the chlorine 31 was replenished with another alkali solution.

The gas was again fed from the permeator to entrap chlorine into the solution. The degrading reaction was conducted using the chlorine solution (functional water (II)) recovered. The same degradation ability as previously attained was maintained.

Repeating the above steps did not decrease the degrading ability. The chlorine contained in the reacted gas was recovered with the alkali solution. When the desirable chlorine concentration was achieved, the pH was adjusted. It was confirmed that the chlorine solution (functional water (II)) having ability to produce the chlorine-containing air that is needed for degradation was again obtained. It was further confirmed that the chlorine produced from the solution (functional water (II)) was used to conduct continuous degradation.

Reference Embodiment 2

In Reference Embodiment 1, the chlorine-containing water (chlorine solution, functional water) is aerated with the gas to be degraded. In Reference Embodiment 2, the gas to be degraded is fed and the chlorine-containing water (chlorine solution, functional water) is aerated separately.

In FIG. 3, the reaction vessel 5 is a container for storing a mixture of the chlorine-containing air fed from the tank for producing the chlorine gas 11, and the gaseous organic chlorine compound to be degraded. The light was irradiated onto the reaction vessel 5. The gaseous organic chlorine compound to be degraded is fed from the means for providing the substance to be degraded 1 to the reaction vessel 5.

The chlorine-containing water (chlorine solution, functional water) is continuously fed into the tank for producing the chlorine gas 11 via the pipe 26 at a desired flow rate, and drained from the pipe 27. The chlorine-containing water (functional water (I)) is prepared in the tank for the chlorine solution 21. The gas to be aerated is continuously fed into the tank for producing the chlorine 11 via a feed pipe 13 at a desired flow rate. Then, the chlorine gas-containing gas is exhausted from an exhaust pipe 3. The chlorine-containing gas is introduced into the reaction vessel 5 and mixed with the substance to be degraded. The reaction vessel 5 is light-irradiated with the means for irradiating the light 4 to degrade the compound to be degraded.

It is desirable that an excess amount of chlorine exceeding the required amount for degradation be fed to completely degrade the subject. The purified gas contains chlorine exhausted from the exhaust pipe 6. The chlorine is collected and recovered in the subsequent means for entrapping the chlorine 31. In the means for collecting the chlorine, the alkali solution is contacted with the purified gas containing the chlorine exhausted from the pipe 6. The chlorine is entrapped into the alkali solution. The purified air containing no chlorine is exhausted from the exhaust pipe 32.

After a predetermined duration of the operation, the residual chlorine concentration in the alkali solution within the means for entrapping the chlorine 31 increases. When the residual chlorine concentration reaches to a specific concentration, desirably 30 to 120 mg/L, the solution is fed into the tank for the chlorine solution 21, which solution can again be used for producing the chlorine-containing air.

It is required to adjust the pH in the tank for the chlorine solution 21. The pH is adjusted by supplying acid via a means for providing acid 33. It is desirable to adjust the pH within the range of 1 to 4, especially 2 to 3. Thus, the chlorine solution (functional water (II)) prepared in the tank for the chlorine solution 21 can be used again to produce the chlorine gas for the degradation.

Referring to FIG. 3, the exemplary reference embodiment proved experimentally will be described below.

A glass column with a volume of 400 mL was used as the reaction vessel 5. A glass bottle was used as the tank for producing the chlorine gas 11. 150 mL of a chlorine solution (functional water (I)) was introduced into the tank 11. 150 mL of another chlorine solution (functional water (I)) was stored in a tank for the chlorine solution 21, fed from the tank 21 at a rate of 2 mL/min, and drained from a drainage pipe 27 at a rate of 2 mL/min.

The chlorine solution (functional water (I)) was prepared from hydrochloric acid and sodium hypochlorite. 0.125 mL of a 12% sodium hypochlorite solution (manufactured by Kishida Chemical Co., Ltd.; the concentration of about 12% as received; effective chlorine: min. 5%) and 0.6 mL of hydrochloric acid (35% hydrochloric acid) were added per 100 mL of raw water. Then, the chlorine solution (functional water (I)) had a pH of 2.5, and the residual chlorine concentration of 95 mg/L.

As the light irradiation means 4, a black light fluorescent lamp (manufactured by Toshiba Corporation under the tradename of "FL20S•BLB"; 230W) was used. Its quantity of light was 0.4 to 0.7 mW/cm$^2$. Although the light is within the reaction vessel in the Figure, the light was irradiated from outside of the glass column to the reaction vessel in the experiment.

Concurrently with the light irradiation, an air containing 160 ppmV of TCE and 40 ppmV of dichloromethane-containing air produced by a permeator manufactured by Gastec KK, was blown to the bottom of the reaction vessel 5 at a rate of 100 mL/min. The air was blown to the tank for producing the chlorine gas 11 at a rate of 100 mL/min.

After 30 minutes of operation, the TCE and the dichloromethane in the exhausted gas from the reaction vessel were sampled periodically via a sampling port 35 with the gas tight syringe, and measured for their concentration using a gas chromatograph (manufactured by Simadzu Corporation under the tradename of "GC-14B" (having a FID detector); column is manufactured by J & W Corporation under the tradename of "DB-624"). Neither TCE nor dichloromethane was detected. After the operation was completed, the TCE and the dichloromethane in the drainage of the chlorine solution were sampled. Again, neither TCE nor dichloromethane was detected. As a result, it is proved that the TCE and the dichloromethane can be dissolved.

The gas exhausted from the exhaust pipe 6 was blown into the alkali solution containing 120 mL of sodium hydroxide with a pH of 11.2 within the means for entrapping the chlorine 31. At the exhaust pipe 32, the chlorine concentration was measured several times using a detecting tube (manufactured by Gastec KK under the tradename of "No. 8H"), and was 0.5 ppm or less each time.

After 60 minutes of operation while maintaining the above conditions, the pH and the chlorine concentration of the alkali solution in the means for entrapping the chlorine 31 were measured. As a result, the pH was 9.5 and the residual chlorine concentration was 94 mg/L. The gas fed from the permeator was creased, a cock 34 was open to transfer the alkali solution containing chlorine in the means for entrapping the chlorine 31 to the tank for the chlorine solution 21. Using the means for providing an acidic solution 33, 0.06 mL of hydrochloric acid (35%) was added thereto. As a result, the pH was 2.9 and the residual chlorine concentration was 93 mg/L. The raw water was added so that the residual chlorine concentration was adjusted to 70 mg/L. Several drops of hydrochloric acid were added to adjust the pH to 2.3. Then, the means for entrapping the chlorine 31 was replenished with another alkali solution.

The gas was again fed from the permeator to entrap chlorine into the solution. The degrading reaction was conducted using the recovered chlorine solution (functional water (II)). The same degradation ability as previously attained was maintained.

Repeating the above steps did not decrease the degrading ability. The chlorine contained in the reacted gas was recovered with the alkali solution. When the desirable chlorine concentration was achieved, the pH was adjusted. It was confirmed that the chlorine solution (functional water (II)) having ability to produce the chlorine-containing air that is needed for degradation was again obtained. It was further confirmed that the chlorine produced from the solution (functional water (II)) was used to conduct continuous degradation.

Reference Embodiment 3

In Reference Embodiment 3, the apparatus was based on that of Reference Embodiment 2, except that an entrapping or trapping device with the acidic solution was used.

Figure 4:
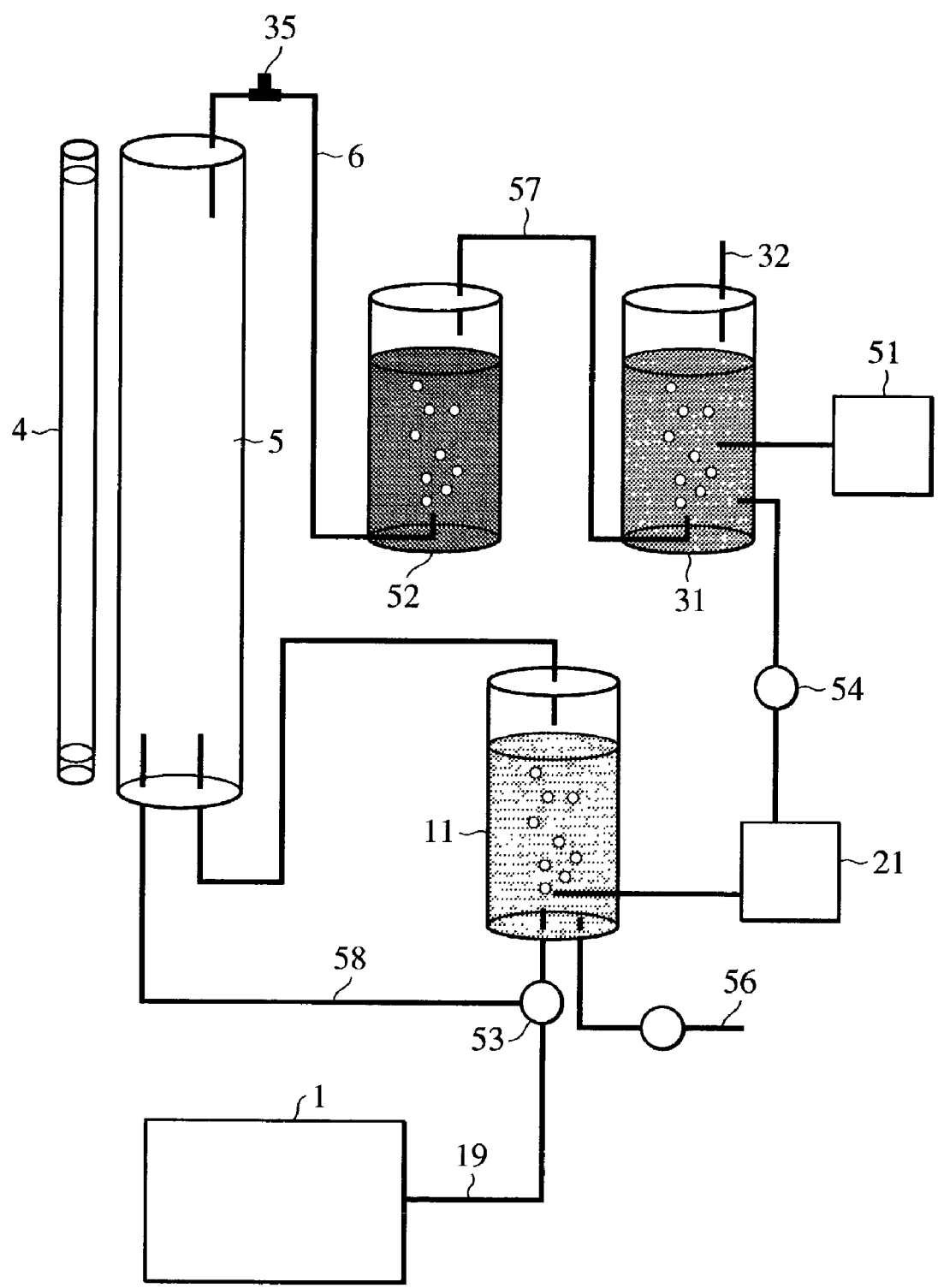
FIG. 4 is a schematic view of a degradation apparatus of reference embodiment 3 in relation to the present invention.

In FIG. 4, the reaction vessel 5 is a container for storing a mixture of the chlorine-containing air fed from the tank for producing the chlorine gas 11 and the gaseous organic chlorine compound to be degraded. The light was irradiated to the reaction vessel 5. The gaseous organic chlorine compound to be degraded is fed from the means for providing the substance to be degraded 1 via a pipe 19, is distributed to the tank for producing the chlorine gas 11, and a pipe 58 via a valve 53, as required. Finally, the compound is provided to the reaction vessel 5. The chlorine-containing gas and the substance to be degraded introduced into the reaction vessel 5 are mixed. The reaction vessel 5 is irradiated by the light irradiating means 4, whereby the compound to be degraded is degraded.

The chlorine-containing water (chlorine solution, functional water) is fed from the tank for the chlorine solution tank 21. A pipe 56 is a drainage pipe.

It is desirable that an excess amount of chlorine exceeding the required amount for degradation be fed to completely degrade the subject to be degraded. The purified gas contains chlorine exhausted from the exhaust pipe 6. The chlorine is collected and recovered in the subsequent means for entrapping the chlorine 31. In the means for collecting the chlorine, the alkali solution is contacted with the purified gas containing the chlorine exhausted from the pipe 6. The chlorine is entrapped in the alkali solution. The purified air containing no chlorine is exhausted from the exhaust pipe 32.

The purified gas containing the chlorine exhausted from the exhaust pipe 6 may contain acidic substances. In this case, the degraded product is mainly acidic, and is exhausted along with the purified gas. When the chlorine is entrapped in the alkali solution, the acidic substances are also entrapped in the solution. The hydrogen ion concentration (pH value) of the alkali solution is gradually decreased. Finally, the alkali solution becomes an acidic solution to lose the ability to entrap the chlorine.

In order to overcome such a problem, the means for entrapping the acidic substances 52 is disposed upstream of the means for entrapping the chlorine 31. In the means for entrapping the acidic substances 52, the acidic solution is contacted with a purified gas containing the chlorine exhausted from the pipe 6 to collect the water soluble acidic substances. Most of the chlorine contained in the purified gas is not trapped in the acidic solution, is sent to the means for entrapping the chlorine 31, and is then recovered.

For example, when the contaminant is trichloroethylene, the purified gas containing the chlorine exhausted from the exhaust pipe 6 contains dichloroacetic acid. This acid is produced by reacting water in air with dichloroacetyl chloride that is a degraded product of trichloroethylene. Dichloroacetic acid is liquid at normal temperature and pressure. When dichloroacetic acid becomes a mist, it is discharged, in many cases, together with the purified gas. The purified gas containing dichloroacetic acid is collected in the solution by the means for entrapping the acidic substances 52, which is the first trap. When the solution is acidic, there is less chlorine that can be dissolved in the solution. The chlorine contained in the purified gas is hardly entrapped in the first trap for the acidic solution, and is recovered by the second trap of the means for entrapping the chlorine 31 via a pipe 57.

The above-described configuration including the first and second traps is not limited to a specific method described above, but is applicable to any methods, devices, and configurations to process chlorine. In other words, the configuration can be used as a post-processing of the method of degrading and purifying the contaminants and its apparatus by light-irradiating the air to be processed containing chlorine and the contaminants with the light irradiating means to degrade the contaminants. The use of the recovered chlorine is not essential. If the chlorine is drained as it is, the configuration can be used. The present configuration including the first and second traps can be used for light degradation of compounds other than chlorine, since the use of the recovered chlorine is not essential.

As described above, according to the present invention, the configuration including the first trap of the acidic solution and the second trap for entrapping the chlorine can have additional uses. On such use is described in Embodiment 1.

The means for entrapping the acidic substances 52 may be any solutions as long as the acidic substances are collected. It is desirable that the hydrogen concentration (pH value) of the solution be 4 or less, especially 1 to 3. Examples include at least one solution selected from the group consisting of hydrochloric acid, hydrofluoric acid, oxalic acid, sulfuric acid, phosphoric acid, boric acid, acetic acid, formic acid, malic acid, and citric acid. However, the alkali solution may be used to collect the acidic substance as shown in Reference Embodiment 4. In this case, the predetermined amount of the chlorine is entrapped in the alkali solution for a certain duration. As the acidic substances are collected, the pH of the alkali solution decreases. The chlorine is again discharged. In other words, it is possible to start with the alkali solution for collecting the acidic substances. As the operation proceeds, the pH (hydrogen ion concentration) of the solution for collecting the acidic substances becomes within the range defined above.

After the predetermined duration of operation, the residual chlorine concentration of the alkali solution in the means for entrapping the chlorine 31 increases. When the residual chlorine concentration reaches to a specific level, desirably 30 to 120 mg/L, the solution is sent to the tank for the chlorine solution 21, and can be used again to produce the chlorine-containing air.

At the time, it is required to adjust the pH in the tank for the chlorine solution 21. It is desirable to adjust the pH within the range of 1 to 4, especially 2 to 3. Thus, the chlorine solution (functional water (II)) adjusted in the tank for the chlorine solution 21 can be used again for producing the chlorine gas for the degradation.

Referring to FIG. 4, the exemplary reference embodiment proved experimentally will be described below.

A glass column with a volume of 400 mL was used as the reaction vessel 5. A glass bottle was used as the tank for producing the chlorine gas 11. 150 mL of a chlorine solution (functional water (I)) were introduced into the tank 11. 150 mL of another chlorine solution (functional water (I)) were stored in a tank for the chlorine solution 21, fed from the tank 21 at a rate of 2 mL/min, and drained from a drainage pipe 56 at a rate of 2 mL/min.

The chlorine solution (functional water (I)) was prepared from hydrochloric acid and sodium hypochlorite. 0.125 mL of a 12% sodium hypochlorite solution (manufactured by Kishida Chemical Co., Ltd.; the concentration of about 12% as received; effective chlorine: min. 5%) and 0.63 mL of hydrochloric acid (35% hydrochloric acid) were added per 100 mL of raw water. Then, the chlorine solution (functional water (I)) had a pH of 2.5 and the residual chlorine concentration of 105 mg/L.

As the light irradiation means 4, a black light fluorescent lamp (manufactured by Toshiba Corporation under the tradename of "FL20S•BLB"; 230W) was used. Its quantity of light was 0.4 to 1.2 mW/cm$^2$.

Concurrently with the light irradiation, an air containing 250 ppm of TCE-containing air produced by a permeator manufactured by Gastec KK, was blown to the bottom of the reaction vessel 5 at a rate of 100 mL/min. The air was blown to the tank for producing the chlorine gas 11 at a rate of 100 mL/min.

After 30 minutes of operation, TCE in the exhausted gas from the reaction vessel was sampled periodically via a sampling port 35 and the concentrations were measured using a gas chromatograph (manufactured by Simadzu Corporation under the tradename of "GC-14B" (having a FID detector); column is manufactured by J & W Corporation under the tradename of "DB-624"). No TCE was detected. After the operation was completed, TCE in the drainage of the chlorine solution was sampled. Again, no TCE was detected. As a result, it is proved that TCE can be dissolved.

The gas exhausted from the exhaust pipe 6 was blown into 100 mL of a hydrochloric acid solution with a pH of 3.2 within the means for entrapping the acidic substances 52. The purified gas passed through the acidic solution was blown in the alkali solution containing 120 mL of sodium hydroxide with a pH of 11.2 within the means for entrapping the chlorine 31 via the pipe 57. At the exhaust pipe 32, the chlorine concentration was measured several times using a detecting tube (manufactured by Gastec KK under the tradename of "No. 8H"), and was 0.5 ppm or less each time.

After 180 minutes of operation while maintaining the above conditions, the pHs and the chlorine concentrations of the acidic solution in the means for entrapping the acidic substances 52 and the alkali solution in the means for entrapping the chlorine 31 were measured. As a result, the pHs were 1.2 and 11.0 and the residual chlorine concentrations were 32 mg/L and 217 mg/L, respectively. The gas fed from the permeator was creased, a valve 54 was open to transfer the alkali solution containing chlorine in the means for entrapping the chlorine 31 to the tank for the chlorine solution 21. 0.06 mL of hydrochloric acid (35%) was added thereto. As a result, the pH was 2.9 and the residual chlorine concentration was 188 mg/L. The raw water was added so that the residual chlorine concentration was adjusted to 70 mg/L. Several drops of hydrochloric acid were added to adjust the pH to 2.3. Then, the means for entrapping the chlorine 31 was replenished with another alkali solution.

The gas was again fed from the permeator to entrap chlorine in the solution. The degrading reaction was conducted using the chlorine solution (functional water (II)) recovered. The same degradation ability as previously attained was maintained.

Repeating the above steps did not decrease the degrading ability. The chlorine contained in the reacted gas was recovered with the alkali solution. When the desirable chlorine concentration was achieved, the pH was adjusted. It was confirmed that the chlorine solution (functional water (II)) having ability to produce the chlorine-containing air that is needed for degradation was again obtained. It was further confirmed that the chlorine produced from the solution was used to conduct continuous degradation.

Reference Embodiment 4

The degradation experiment was conducted using the apparatus similar to that used in Reference Embodiment 4, expect that the alkali solution was used instead of the acidic solution as the means for entrapping the acidic substances 52.

The TCE concentration measured at the sampling port 35 and the chorine concentration measured at the exhaust pipe 32 were similar to those in Reference Embodiment 3. The contaminants were successfully purified, and the chlorine was also favorably recovered.

After 180 minutes of continuous degradation, the pH and the chlorine concentrations of the acidic solution in the means 52 and the alkali solution in the means 31 were measured. As a result, the pHs were 3.0 and 10.2, and the chlorine concentrations were 20 mg/L and 185 mg/L, respectively.

In view of the results of Reference Embodiments 3 and 4, the acidic solution has extremely low ability to collect the chlorine. When a high concentrated contaminated gas is processed continuously for a long time, the device for entrapping the acidic substances is disposed at an upstream of the device for entrapping the chlorine, whereby a change in the pH of the liquid for entrapping the chlorine is inhibited and the chlorine is effectively and completely recovered.

Reference Embodiment 5

In Reference Embodiments 1 and 2, the chlorine-containing gas was produced by aerating the chlorine-containing water (functional water). In Reference Embodiment 5, the production of the chlorine-containing gas is facilitated in the degradation reaction using small droplets of the chlorine-containing water (functional water) to enhance the efficiency of the gas-liquid contact.

Figure 5:
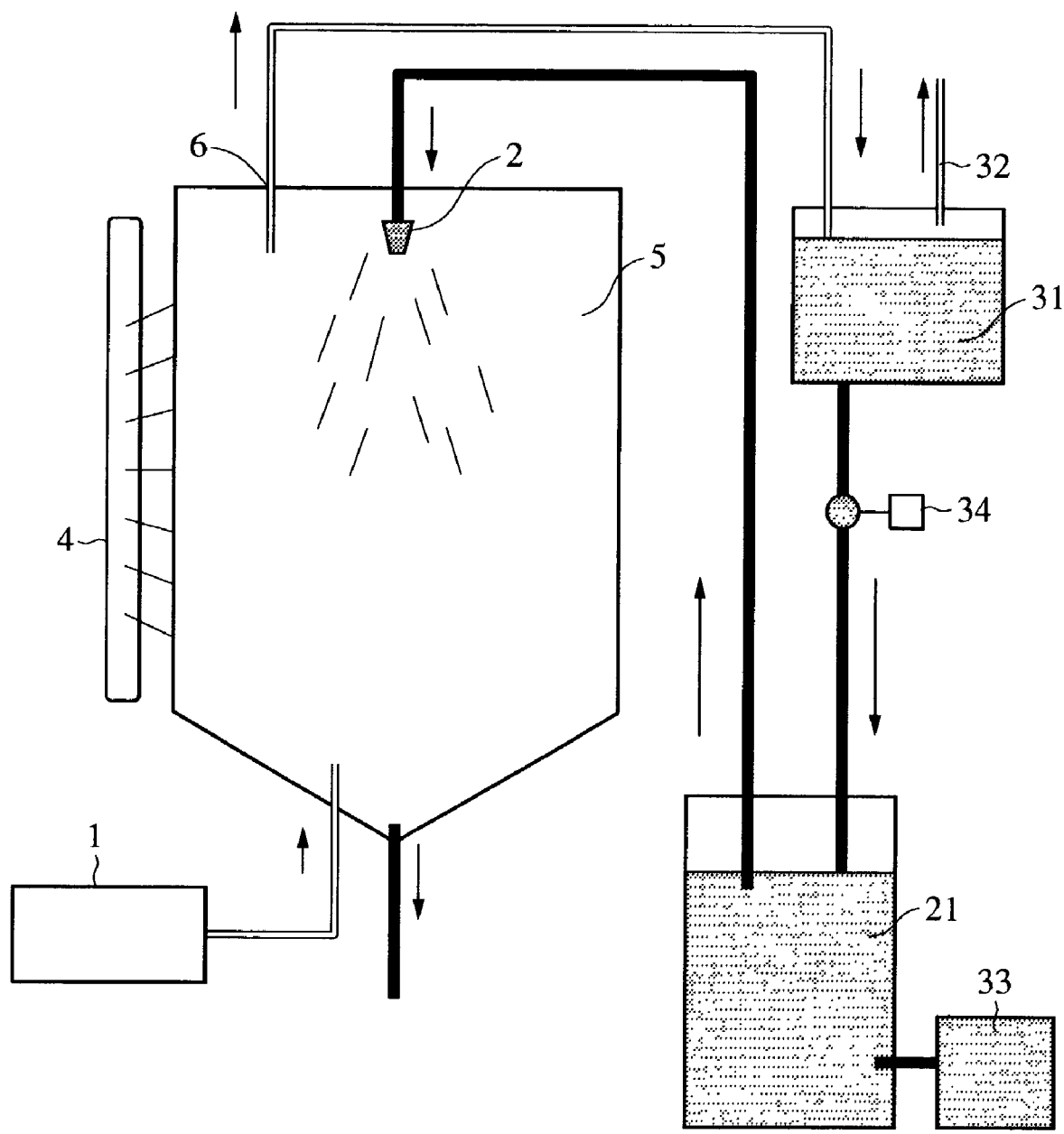
FIG. 5 is a schematic view of a degradation apparatus of Reference Embodiment 5 in relation to the present invention.

In FIG. 5, a nozzle 2 for blowing the small droplets of the chlorine-containing water (functional water) is disposed at the upper part of the reaction vessel 5. The chlorine solution is continuously provided by a means for controlling the supply of the chlorine solution (functional water) 31 via the nozzle 2 in the reaction vessel 5 at a desired flow rate. The substance to be degraded is provided by the means for providing the substance to be degraded 1 from the bottom part of the reaction vessel 5. In the reaction vessel 5, the chlorine-containing air produced from the chlorine solution (functional water) is mixed with the gaseous organic chlorine compound to be degraded. The chlorine solution (functional water) is contacted with the gaseous organic chlorine compound to be degraded. The reaction vessel 5 is light-irradiated with the light irradiation means 4.

In order to completely degrade the substance to be degraded, it is desirable to provide an excess amount of chlorine exceeding the required amount for degradation. Accordingly, the purified gas exhausted from the exhaust pipe 6 contains chlorine. The chlorine is collected and recovered by a means for entrapping the chlorine 31. In the means for collecting chlorine, the alkali solution is contacted with the purified gas containing chlorine exhausted from the pipe 6. The chlorine is entrapped into the alkali solution, and a purified air containing no chlorine is exhausted from an exhaust pipe 32.

After the operation is continued for a predetermined duration, the residual chlorine concentration of the alkali solution in the means for entrapping the chlorine 31 increases. When the residual chlorine concentration reaches to a specific concentration, desirably 30 to 120 mg/L, the solution is sent to the tank for the chlorine solution 21, and then can be used again to produce the chlorine-containing air.

At the time, it is required to adjust the pH in the tank for the chlorine solution 21. The pH is adjusted by providing an acid from a means for providing an acid 33. It is desirable to adjust the pH within the range of 1 to 4, especially 2 to 3. The chlorine solution (functional water (II)) prepared in the tank for the chlorine solution 21 is blown through the nozzle 2 as the small droplets, and can be again used for producing the chlorine gas for use in the degradation.

Reference Embodiment 6

The chlorine solution recovered by entrapping it into the liquid is provided continuously to produce the chlorine gas for the degradation.

In FIG. 6, the reaction vessel 5 is a container for storing a mixture of the chlorine-containing air fed from the tank for producing the chlorine gas 11 and the gaseous organic chlorine compound to be degraded. The light was irradiated to the reaction vessel 5. The gaseous organic chlorine compound to be degraded is fed from the means for providing the substance to be degraded 1 to the reaction vessel 5.

The chlorine-containing alkali water is continuously fed into the tank for producing the chlorine gas 11 via the pipe 26 at a desired flow rate and drained from the pipe 27. The chlorine-containing alkali water is recovered from the means for entrapping the chlorine 31 and is continuously provided as the chlorine-containing water via the pipe 26.

In the tank for producing the chlorine 11, the chlorine-containing alkali solution is mixed with the acid-containing solution from the means 33. The tank for producing the chlorine 11 is aerated via the feed pipe 13 at a desired flow rate. As a result, the chlorine-gas containing gas is exhausted from the exhaust pipe 3. The chlorine-containing gas is introduced into the reaction vessel 5, and is mixed with the substance to be degraded. Then, the reaction vessel 5 is light-irradiated by the light irradiation means 4 to degrade the compound to be degraded.

In order to completely degrade the substance to be degraded or accelerate the degradation speed, it is desirable to provide an excess amount of chlorine exceeding the required amount for degradation. Accordingly, the purified gas contains chlorine exhausted from the exhaust pipe 6. The chlorine is collected and recovered in the subsequent means for entrapping the chlorine 31. In the means for collecting the chlorine, the alkali solution is contacted with the purified gas containing the chlorine exhausted from the pipe 6. The chlorine is entrapped into the alkali solution. The purified air containing no chlorine is exhausted from the exhaust pipe 32.

At the time, the alkali solution in the means for entrapping the chlorine 31 is fed from a means for providing the alkali solution 51 at the constant speed. After the predetermined time elapsed, the alkali solution containing the chlorine becomes nearly constant concentration. Then, the solution is sent via the pipe 26.

The chlorine concentration of the solution fed into the tank for producing the chlorine 11 can be controlled by adjusting the feed amount of the alkali solution and the amount of the chlorine-containing gas after degradation. For example, when the amount of the chlorine-containing gas after the degradation is constant within the unit time, the chlorine concentration of the solution provided to the tank for producing the chlorine 11 can be increased as the feed amount of the alkali solution is decreased. This denotes that a small amount of the solution can provide a high amount of the chlorine.

When the operation is conducted continuously and the effective chlorine concentration in the solution of the tank for producing the chlorine 11 is lower than required, hypochlorite is preferably replenished. The hypochlorite is added from a means for replenishing chlorine 61.

When the solution in the means for entrapping the chlorine 31 is sodium hydroxide, the chlorine is entrapped in the liquid by the following reaction:

$Cl_2 + 2NaOH \rightarrow NaClO + NaCl + H_2O$

The chlorine is hardly consumed during the degradation in the reaction vessel 5. In the means for entrapping the chlorine 31, approximately half the amount of the chlorine becomes NaClO, which can be recycled to produce chlorine in the tank 11. The shortage of the chlorine is overcome by employing the means for replenishing chlorine 61.

However, the chlorine may be discharged from the substance to be degraded during the degradation in the reaction vessel 5. Depending on the concentration of the chlorine thus discharged, the amount of the hypochlorite replenished from the means for replenishing chlorine 61 can be diminished.

As described above, the alkali solution in the means for entrapping the chlorine 31 is fed from the means for providing the alkali solution 51 at a constant speed. The chlorine-containing alkali water is fed continuously to the tank for producing the chlorine gas 11 at a desired flow rate. Such feeding may be conducted intermittently.

Referring to FIG. 6, the exemplary reference embodiment proved experimentally will be described below.

A glass column with a volume of 400 mL was used as the reaction vessel 5. A glass bottle was used as the tank for producing the chlorine gas 11. 150 mL of a chlorine solution (functional water (I)) were introduced into the tank 11.

The chlorine solution (functional water (I)) was prepared from hydrochloric acid and sodium hypochlorite. 0.25 mL of a 12% sodium hypochlorite solution (manufactured by Kishida Chemical Co., Ltd.; the concentration of about 12% as received; effective chlorine: min. 5%) and 1.0 mL of hydrochloric acid (35% hydrochloric acid) were added per 100 mL of raw water. Then, the chlorine solution (functional water (I)) had a pH of 2.5, and the residual chlorine concentration of 210 mg/L. Using the chlorine solution (functional water (I)), a continuous experiment was started.

As the light irradiation means 4, a black light fluorescent lamp (manufactured by Toshiba Corporation under the tradename of "FL20S•BLB"; 230W) was used. Its quantity of light was 0.4 to 0.7 mW/cm². Although the light is within the reaction vessel in the FIG. 6, the light was irradiated from outside of the glass column to the reaction vessel in the experiment.

Concurrently with the light irradiation, an air containing 160 ppmV of TCE and 40 ppmV of dichloromethane-containing air produced by a permeator, manufactured by Gastec KK, was blown to the bottom of the reaction vessel 5 at a rate of 300 mL/min. The air was blown to the tank for producing the chlorine gas 11 at a rate of 150 mL/min.

After 30 minutes of operation, TCE and the dichloromethane in the exhausted gas from the reaction vessel were sampled periodically via a sampling port 35 with the gas tight syringe, and measured for their concentration using a gas chromatograph (manufactured by Simadzu Corporation under the tradename of "GC-14B" (having a FID detector); column is manufactured by J & W Corporation under the tradename of "DB-624"). Neither TCE nor dichloromethane was detected. After the operation was completed, TCE and dichloromethane in the drainage of the chlorine solution were sampled. Again, neither TCE nor dichloromethane was detected. As a result, it is proved that TCE and dichloromethane can be dissolved.

The chlorine concentration after the degradation reaction was measured at the sampling port 35 using the detecting tube. The chlorine concentration was about 150 ppmV.

The gas exhausted from the exhaust pipe 6 was blown into 120 mL of the alkali solution including sodium hydroxide with a pH of 11.2 within the means for entrapping the chlorine 31. At the exhaust pipe 32, the chlorine concentration was measured several times using a detecting tube (manufactured by Gastec KK under the tradename of "No. 8H"), and was 0.5 ppm or less each time. The alkali solution including sodium hydroxide was fed via the alkali water feed pipe 68 at a rate of 2 mL/min, and exhausted via the pipe 26 at a rate of 2 mL/min. It should be noted that the pipe 26 was not connected to the tank for producing the chlorine gas 11.

After 90 minutes of operation while maintaining the above conditions, the pH and the chlorine concentration of the alkali solution in the means for entrapping the chlorine 31 were measured. As a result, the pH was 10.4 and the residual chlorine concentration was 92 mg/L. The gas fed from the permeator was creased, the pipe 26 was connected to the tank for producing the chlorine gas 11 to send the chlorine-containing alkali solution in the means 31 to the tank for the chlorine solution 21.

Using the means for providing the acid 33, hydrochloric acid (3.5%) was added thereto so that the pH was within the range of 2.1 to 2.9.

In order to overcome the shortage of chlorine in the form of the hypochlorite solution, the solution containing sodium hypochlorite was added from a means for replenishing chlorine 61 to the tank for producing the chlorine gas 11 at a rate of 0.2 mg/min.

The gas was again fed from the permeator to entrap chlorine in the solution. The degrading reaction was conducted using the recovered chlorine solution (functional water (II)). The same degradation ability as previously attained was maintained.

Repeating the above steps did not decrease the degrading ability. The chlorine contained in the reacted gas was recovered with the alkali solution. The chlorine was provided continuously so that the desirable chlorine concentration was achieved. The pH was adjusted. It was confirmed that the chlorine solution having the ability to produce the chlorine-containing air that is needed for degradation was again obtained. It was further confirmed that the chlorine produced was used to conduct continuous degradation.

Reference Embodiment 7

In Reference Embodiment 6, the solution containing sodium hypochlorite is added from the means for replenishing chlorine 61 to the tank for producing the chlorine gas 11 in order to replenish the chlorine. In Reference Embodiment 7, the chlorine concentration of the alkali solution in the means for entrapping the chlorine 31 is kept constant. The chlorine solution recovered by being trapped in the liquid is provided continuously to produce the chlorine gas required for the degradation.

Figure 7:
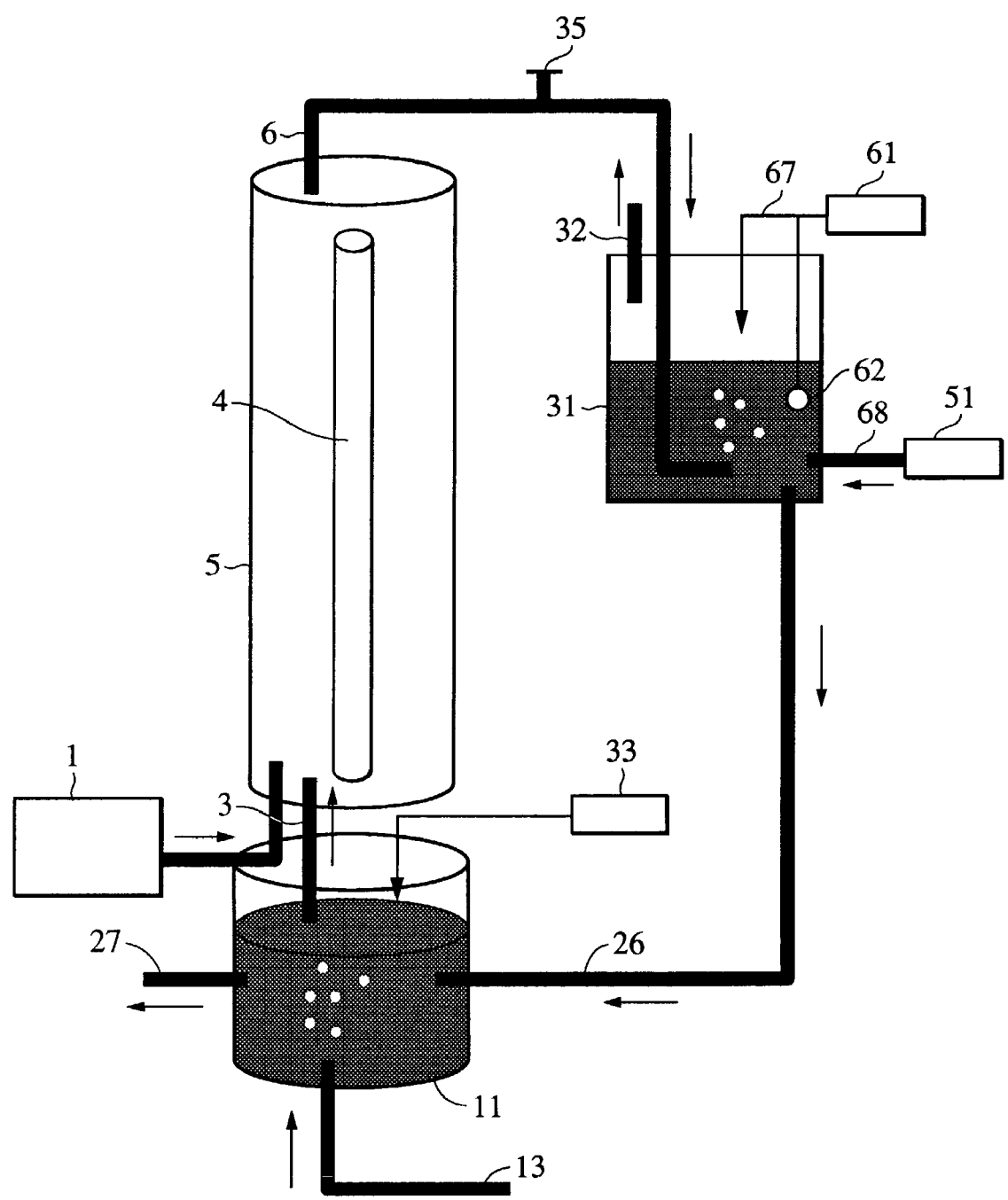
FIG. 7 is a schematic view of a degradation apparatus of Reference Embodiment 7 in relation to the present invention.

FIG. 7 schematically shows Reference Embodiment 7, and is the similar apparatus shown in FIG. 6 except for the means for replenishing the chlorine 61 and a means for detecting a chlorine concentration 62.

The chlorine concentration of the alkali solution in the means for entrapping the chlorine 31 after the reaction is measured using the means for detecting the chlorine concentration 62. The shortage of the chlorine is replenished with the solution containing sodium hypochlorite provided by the means for replenishing the chlorine 61 so that the chlorine concentration is kept constant. Thus, the solution with the required and constant chlorine concentration via the pipe 26 is always sent to the tank for producing the chlorine gas 11.

Any means can be used for the means for detecting the chlorine concentration 62. For example, known technologies such as an electrochemical sensor and light absorption can be used.

Thus, the amount of the chlorine, i.e., the chlorine-containing solution, provided is controlled.

The embodiments of the present invention will be described below.

Embodiment 1

Referring to FIG. 8, the exemplary embodiment of the present invention proved experimentally will be described below.

A soil that was contaminated with an organic chlorine compound, i.e., a substance to be degraded, was sucked with a vacuum suction pump to feed a contaminated gas into a light degradation tank at a rate of 1 $m^3$/min (residence time of 30 seconds).

The contaminated gas mainly contained 5 to 20 ppmV of trichloroethylene, and 5 to 30 ppmV of tetrachloroethylene. The chlorine was fed from a chlorine cylinder to adjust the chlorine concentration of 50 ppmV in the reaction vessel. Although the light irradiating means 4 was disposed inside of the reaction vessel in the Figure, the light was irradiated from outside of the vessel using 16 black light fluorescent lamps (manufactured by Toshiba Corporation under the tradename of "FL40S BLB").

A side of the reaction vessel was covered with a fluororesin. Light with a wavelength of 300 nm or more was radiated therethrough.

Once the operation with the apparatus was started, trichloroethylene and tetrachloroethylene in the exhaust gas from the light degradation part were sampled periodically with the gas tight syringe to measure the concentrations using a gas chromatograph manufactured by Simadzu Corporation under the tradename of "GC-14B" (having a FID detector); column is manufactured by J & W Corporation under the tradename of "DB-624"). Neither trichloroethylene nor tetrachloroethylene was detected.

About 70 L of tap water were stored in a gas-liquid contact tower for absorbing the degraded product. The tower corresponds to the means for entrapping (trapping) the acidic substance 52 in FIG. 8. The tap water was circulated with the pump 65.

The stored liquid circulated absorbed haloacetic acid, which was the degraded product, at the gas-liquid contact part including packed materials 63.

After 1 month of operation, the haloacetic acid contained in the stored liquid reached to the concentration of 3.7%.

In this embodiment, the tap water was used as the solution in the means for entrapping the acidic substance 52. Therefore, the pH was neutral upon the initial operation of the light degradation apparatus. However, as the degradation proceeded, and the degraded product (the acidic substance) was accumulated, the pH decreased, resulting in the acidic solution.

Most of the chlorine contained in the gas after the light degradation was exhausted without residing in the means for entrapping the acidic substance 52.

The exhausted chlorine-containing gas was sent to a second gas-liquid contact tower, which corresponded to the means for entrapping the chlorine 31. About 70 L of 5% sodium hydroxide solution were stored in the second gas-liquid contact tower. A part of the solution was circulated by the pump 66, and a part thereof was exhausted. An exhausted equivalent weight of the 5% sodium hydroxide solution was replenished so that the chlorine absorbing ability was not decreased.

The solution in the gas-liquid contact tower, i.e., in the means for entrapping the acidic substance 52, was circulated without exhausting the solution. It was confirmed that the concentration of the haloacetic acid in the absorbing solution increased.

Accordingly, it was found that the contaminated gas existing widely in the soil could be converted into a small amount of the liquid that can be easily handled.

Embodiment 2

Embodiment 2 was performed similarly to Embodiment 1 except that a degrading means 70 is installed in addition to instead of the solution in the means for entrapping the acidic substance 52 by which the degraded productd were stored in the solution.

As the degrading means 70 shown in FIG. 9, incineration was used. The exhaust gas produced by the incineration was purified at the means for entrapping the chlorine 31. It is not required to continuously send the liquid from the means for entrapping the acidic substance 52 to the degrading means 70. It is rather preferable that the liquid be sent to the degrading means 70 and be incinerated and degraded after the light degradation is conducted for certain duration and the concentration of the degraded product, i.e., haloacetic acid, reaches tens % in the means for entrapping the acidic substance.

Embodiment 3

The present embodiment shows an example of degrading contaminants extracted from a soil using an apparatus for recovering a contaminated soil 41 shown in FIG. 10.

The longitudinal pit 43 was formed in the contaminated soil 42. The contaminants-containing air such as trichloroethylene in the soil was sucked using the vacuum pump 44. The gas-liquid separation unit 45 removed liquid components from the contaminants-containing air sucked with the vacuum pump 44. After the filter 46 removed debris, the contaminants-containing air was sent to the concentrating device 47 at the predetermined flow rate.

The gas sent to the concentrating device 47 was contacted with the absorbent 48 in the device 47. The contaminants were adsorbed to the adsorbent 48, and the gas was purified. The adsorbent 48 was installed in a circular shape, i.e., a rotor shape, and was rotated at a predetermined speed, whereby the adsorbent alternately passed through the adsorption area and the desorption area. That is, the adsorbent on which the contaminants were adsorbed moved from the adsorption area to the desorption area to continuously perform the processing. The flow rate of the contaminants-containing gas sent to the device 47 was 20 m$^3$/min. The adsorbent 48 on which the contaminants were adsorbed was passed through the gas heated with the heater 49 at a flow rate of 1 m$^3$/min to desorb the contaminants from the adsorbent 48 and to discharge them into the gas phase in a gaseous state. Thus, the adsorbent 48 was recovered and the concentrated contaminants could be obtained. The concentration of the contaminants contained in the gas after the desorption could be higher than that in the gas by adjusting the amount of the heated gas sent to the desorption area and by setting a rotating speed of the adsorbent from 48 to 15 rph.

As the concentrating device, the "Admat" manufactured by Taiki Corporation was used. The adsorbent of the device was a mat made by converting fibrous activated carbon into a felt. The mat wound around the cylindrical wire mesh was slowly rotated to sequentially adsorb and desorb the contaminants. A non-treated gas was passed through the mat from the outside to the inside to adsorb the contaminants. Hot air about at 130° C. was passed through the mat from the inside to the outside to desorb the contaminants.

The concentrated gas containing the contaminants was discharged, was then combined with chlorine sent from the chlorine cylinder 110, and was sent to the light reaction vessel 111 together with the chlorine. The concentrated gas was light-irradiated with the light irradiation means in the reaction area to sequentially degrade the contaminants in the concentrated gas.

The outlet of one degrading part was in communication with the inlet of the other degrading part by the curved passage. The gas containing the substance to be degraded introduced into one degrading part was degraded by irradiating light under chlorine. Depending on the flow rate, the gas containing the substance to be degraded flowed at a high flow rate from the one degrading part to the other degrading part. Many substances that were not degraded and remained unreacted may have been undesirably exhausted from the outlet of the one degrading part. When the passage communicating the outlet of the one degrading part with the inlet of the other degrading part was curved, the flow rate of the gas decreased to induce the turbulent flow of the gas in the first, the two degrading parts. The substance to be degraded and chlorine were well agitated, and the substance could be efficiently degraded.

In respective degrading parts, a plurality of light sources were disposed in the present embodiment.

As the light irradiating means, each reaction vessel was equipped with 6 black light fluorescent lamps (manufactured by Toshiba Corporation under the tradename of "FL40S BLB"). As there were 4 reaction vessels, the total number of the black light fluorescent lamps was 24.

A side of the reaction vessel was covered with a fluororesin. The light with a wavelength of 300 nm or more was radiated therethrough.

The degraded product produced in the light reaction vessel 111 was, for example, a haloacetic acid such as trichloroacetic acid and dichloroacetic acid that were known to be produced upon the light degradation of chloroethylene-based substances. These gaseous or mist degraded products exhausted from the light reaction vessel were introduced into the scrubber 113 at a predetermined flow rate so that the gaseous substance to be degraded contacted the liquid and became trapped therein. In order to degrade the degraded products produced in the light reaction vessel 111, the contaminants in the degraded products may have been entrapped into the liquid.

The liquid was circulated with the pump in the scrubber 113. The liquid was discharged from the top of the scrubber using the connecting pipe 114 for connecting the bottom and the top of the scrubber 113. The liquid is contacted with the introduced degraded products that are introduced to be trapped by the liquid. The gas-liquid contact part, a part in which the degraded products contact the liquid, had a labyrinth structure using the filler 115 manufactured by Tomoe Engineering Co., Ltd. under the tradename of "Tripacks" for keeping a long gas-liquid contact time. The organic chlorine compound in the gas to be introduced was easily entrapped into the solution. While the organic chlorine compound was dissolved in the liquid, the liquid absorbing the organic chlorine compound was stored temporarily in the bottom of the scrubber, whereby the circulation was repeated. As the liquid, there was used an electrolyte solution including sodium chloride. The electrolysis tank 116 was disposed at the connecting pipe 114 for connecting the bottom and the top of the scrubber 113. In the electrolysis tank 116, the liquid containing the degraded products was electrolyzed. Chlorine gas and other by-product gases isolated by a redox reaction were discharged together with the liquid to the top of the scrubber 113. The chlorine gas and other by-product gases including hydrogen, oxygen, carbon dioxide, and methane passed through the passage 117 disposed on the top of the scrubber 113, and were sent to the scrubber 118 for entrapping the chlorine in a state that excluded outside air.

The scrubber 118 for entrapping the chlorine had the same configuration as the scrubber 113, except that the sodium hydroxide solution was circulated for entrapping the chlorine. The chlorine was contacted with the alkali solution and is entrapped therein. The purified gas was exhausted outside of the scrubber. In the solution that entrapped chlorine in the scrubber, a part of the chlorine was hypochlorous acid. Hydrochloric acid was added to neutralize it, and sodium sulfite was added to the liquid as the reducing agent to conduct a reducing step.

As a result, leakage to environment of the substance to be degraded, i.e., trichloroethylene, that contaminated the soil, as well as the chlorine, and other chemical components that contaminates the environment could be prevented.

According to the method of the present invention, the resources can be effectively utilized by the recycling chlorine gas. It is also possible to inhibit discharging the chlorine gas outside and to diminish adverse effects on the environment.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of treating an organic chlorine compound comprising the steps of:
   degrading the organic chlorine compound by irradiating it with light in the presence of chlorine gas to obtain a product comprising chlorine;
   contacting the product obtained in the degrading step with a liquid;
   obtaining chlorine gas by subjecting the liquid containing the product to electrolysis; and
   entrapping the chlorine gas produced at least by the electrolysis in an alkali solution.

2. The method according to claim 1, wherein the contacting step is performed so that outside air is excluded.

3. The method according to claim 1, wherein the organic chlorine compound is trichloroethylene.

4. The method according to claim 1, further comprising the steps of:
   neutralizing an alkali substance in the alkali solution; and
   reducing the chlorine entrapped in the alkali solution.

5. The method according to claim 1, wherein the product comprises at least one of monochloroacetic acid, dichloroacetic acid and trichloroacetic acid.

6. The method according to claim 1, further comprising a step of extracting the organic chlorine compound from soil.

7. The method according to claim 1, wherein the chlorine gas entrapped in the alkali solution also contains chlorine gas that was not used up in the degrading step.

8. An apparatus for treating an organic chlorine compound to be degraded comprising:
   irradiating means for irradiating the organic chlorine compound with light in the presence of chlorine gas in order to degrade the organic chlorine compound to obtain a product comprising chlorine;
   contacting means for contacting the product produced by the degradation of the organic chlorine compound with a liquid;
   electrolyzing means for subjecting the liquid containing the product to electrolysis in order to obtain chlorine gas; and
   entrapping means for entrapping the chlorine gas, which is produced at least by the electrolysis, in an alkali solution.

9. The apparatus according to claim 8, wherein the contacting means that prevents penetration of outside air.

10. The apparatus according to claim 8, wherein the organic chlorine compound is trichloroethylene.

11. The apparatus according to claim 8, further comprising a means for neutralizing an alkali substance in the alkali solution, and means for reducing the chlorine trapped in the alkali solution.

12. The apparatus according to claim 8, further comprising a means for extracting the organic chlorine compound from soil.

13. The apparatus according to claim 8, wherein the chlorine gas entrapped in the alkali solution contains chlorine gas remaining after the irradiation.

* * * * *

UNITED STATES PATENT AND TRADEMARK OFFICE
CERTIFICATE OF CORRECTION

PATENT NO. : 7,163,615 B2
APPLICATION NO. : 10/291370
DATED : January 16, 2007
INVENTOR(S) : Kinya Kato et al.

It is certified that error appears in the above-identified patent and that said Letters Patent is hereby corrected as shown below:

ON TITLE PAGE ITEM [56] REFERENCES CITED

Other Publications, after "K.L. Müller et al.", "Phtochemische" should read --Photochemische--.

COLUMN 1

Line 15, "arises" should read --creates--.

COLUMN 3

Line 14, "prevent" should read --present--.

COLUMN 4

Line 1, "a" should be deleted.

COLUMN 7

Line 61, "an" should read --a--; and
Line 65, "called" should read --referred to--.

COLUMN 10

Line 53, "is" should read --are--.

COLUMN 11

Line 63, "communicate" should read --communicates--.

COLUMN 12

Line 10, "first," should read --first of--.

COLUMN 15

Line 4, "chlorine gas-containing" should read --chlorine-containing--.

UNITED STATES PATENT AND TRADEMARK OFFICE
CERTIFICATE OF CORRECTION

PATENT NO. : 7,163,615 B2
APPLICATION NO. : 10/291370
DATED : January 16, 2007
INVENTOR(S) : Kinya Kato et al.

It is certified that error appears in the above-identified patent and that said Letters Patent is hereby corrected as shown below:

COLUMN 18

Line 2, "On such" should read --One such--;
Line 19, "becomes" should read --falls--; and
Line 24, "to" should be deleted.

COLUMN 19

Line 50, "expect" should read --except--; and
Line 54, "chorine" should read --chlorine--.

COLUMN 20

Line 45, "to" (first occurrence) should be deleted.

COLUMN 21

Line 36, "concentration." should read --in concentration.--.

COLUMN 25

Line 5, "productd" should read --products--.

COLUMN 26

Line 16, "first," should read --first of--.

UNITED STATES PATENT AND TRADEMARK OFFICE
CERTIFICATE OF CORRECTION

PATENT NO.       : 7,163,615 B2
APPLICATION NO.  : 10/291370
DATED            : January 16, 2007
INVENTOR(S)      : Kinya Kato et al.

It is certified that error appears in the above-identified patent and that said Letters Patent is hereby corrected as shown below:

COLUMN 28

Line 31, "that" should be deleted.

Signed and Sealed this

Twenty-eighth Day of August, 2007

JON W. DUDAS
*Director of the United States Patent and Trademark Office*